United States Patent
Lou et al.

(10) Patent No.: US 11,438,839 B2
(45) Date of Patent: Sep. 6, 2022

(54) CLOSED LOOP TRANSMISSIONS ASSOCIATED WITH WAKE-UP RADIOS

(71) Applicant: INTERDIGITAL PATENT HOLDINGS, INC., Wilmington, DE (US)

(72) Inventors: Hanqing Lou, Syosset, NY (US); Alphan Sahin, Westbury, NY (US); Xiaofei Wang, Cedar Grove, NJ (US); Oghenekome Oteri, San Diego, CA (US); Li Hsiang Sun, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/611,186

(22) PCT Filed: May 4, 2018

(86) PCT No.: PCT/US2018/031102
§ 371 (c)(1),
(2) Date: Nov. 5, 2019

(87) PCT Pub. No.: WO2018/204793
PCT Pub. Date: Nov. 8, 2018

(65) Prior Publication Data
US 2020/0196241 A1 Jun. 18, 2020

Related U.S. Application Data

(60) Provisional application No. 62/595,750, filed on Dec. 7, 2017, provisional application No. 62/501,892, filed on May 5, 2017.

(51) Int. Cl.
*H04W 52/02* (2009.01)
*H04W 4/06* (2009.01)

(52) U.S. Cl.
CPC ........ *H04W 52/0229* (2013.01); *H04W 4/06* (2013.01); *H04W 52/028* (2013.01); *H04W 52/0216* (2013.01); *H04W 52/0235* (2013.01)

(58) Field of Classification Search
CPC ......... H04W 52/0229; H04W 52/0216; H04W 52/0235; H04W 52/028; H04W 4/06; Y02D 30/70
See application file for complete search history.

(56) References Cited

U.S. PATENT DOCUMENTS 6,879,567 B2   4/2005  Callaway et al.
8,631,254 B2   1/2014  Kwak
(Continued)

FOREIGN PATENT DOCUMENTS

CN   1449158 A       10/2003
CN   102448014 B     3/2016

OTHER PUBLICATIONS

Aboul-Magd, "802.11 HEW SG Proposed PAR," IEEE 802.11-14/0165r0 (Jan. 22, 2014).
(Continued)

*Primary Examiner* — Robert C Scheibel
(74) *Attorney, Agent, or Firm* — Volpe Koenig

(57) ABSTRACT

Methods, systems, and apparatuses are disclosed for operating a wireless transmit/receive unit (WTRU) in a wake-up radio (WUR) state and receiving a (WUR) frame from an access point (AP). A WUR frame may include a multicast counter (MC) field. A determination may be made whether a received MC value in a received MC field is a same value as a stored MC value. Where a received MC value is the same value as a stored MC value, the WTRU may operate in the WUR state. Where a received MC value is not the same value as a stored MC value, the WTRU may operate in a primary connectivity radio (PCR) state.

12 Claims, 17 Drawing Sheets

(56) References Cited

U.S. PATENT DOCUMENTS

| | | | |
|---|---|---|---|
| 2012/0119902 A1 | 5/2012 | Patro et al. | |
| 2014/0269465 A1 | 9/2014 | Ballantyne et al. | |
| 2016/0165625 A1 | 6/2016 | Seok | |
| 2020/0196243 A1* | 6/2020 | Kim | H04W 56/00 |
| 2020/0236624 A1* | 7/2020 | Kim | H04W 76/28 |
| 2020/0245238 A1* | 7/2020 | Kim | H04W 52/0206 |
| 2020/0252858 A1* | 8/2020 | Wang | H04W 48/08 |
| 2020/0288397 A1* | 9/2020 | Ahn | H04W 74/0808 |

OTHER PUBLICATIONS

Aboul-Magd, "802.11 HEW SG Proposed PAR," IEEE 802.11-14/0165r1 (Mar. 17, 2014).

Aboul-Magd, "IEEE 802.11 HEW SG Proposed CSD," IEEE 802.11-14/0169r0 (Jan. 22, 2014).

Aboul-Magd, "IEEE 802.11 HEW SG Proposed CSD," IEEE 802.11-14/0169r1 (Mar. 18, 2014).

Azizi et al., "A PAR Proposal for Wake-up Radio," IEEE 802.11-16/1045r06, (Jul. 2015).

Azizi et al., "Wake-Up Receiver Usage Scenarios and Applications," IEEE 802.11-16/xxxxr0 (IEEE 802.11-16/0974r0) (Jul. 2016).

Huang et al., "High Level MAC Concept for WUR," IEEE 802.11-17/0071r1 (Jan. 2017).

Huang, "Specification Framework for TGba," IEEE 802.11-17/0575r5 (Sep. 29, 2017).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

* cited by examiner

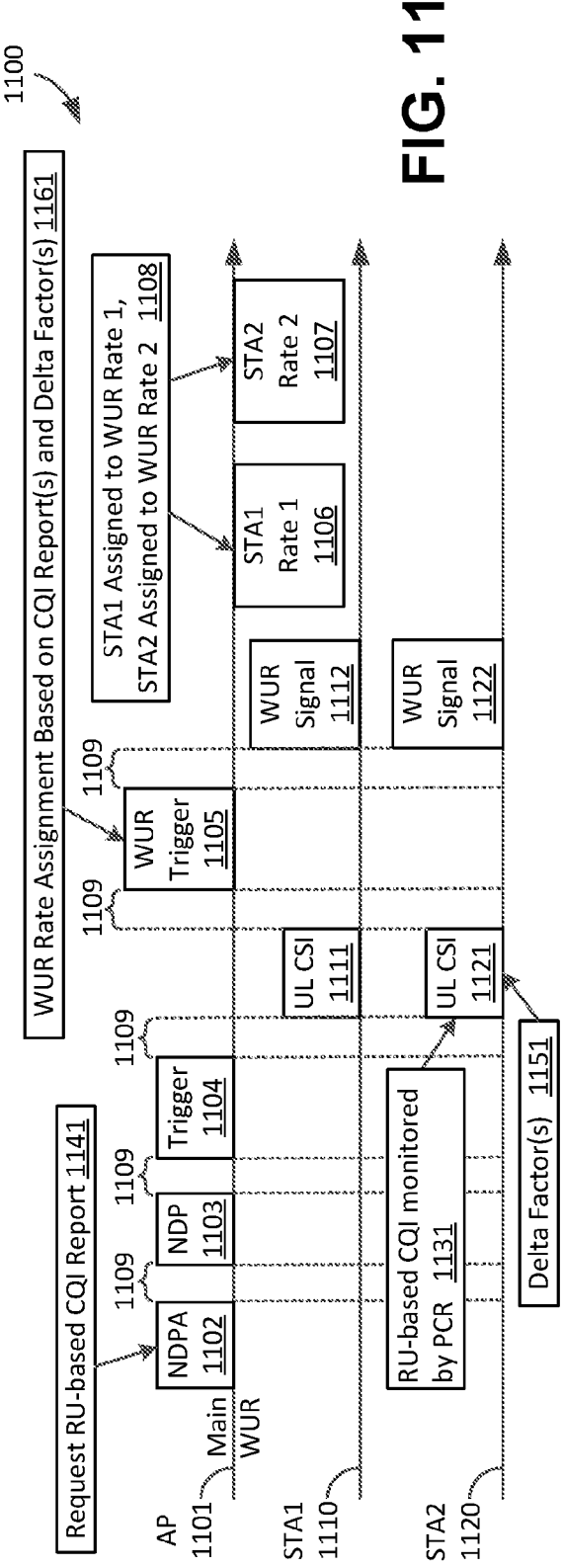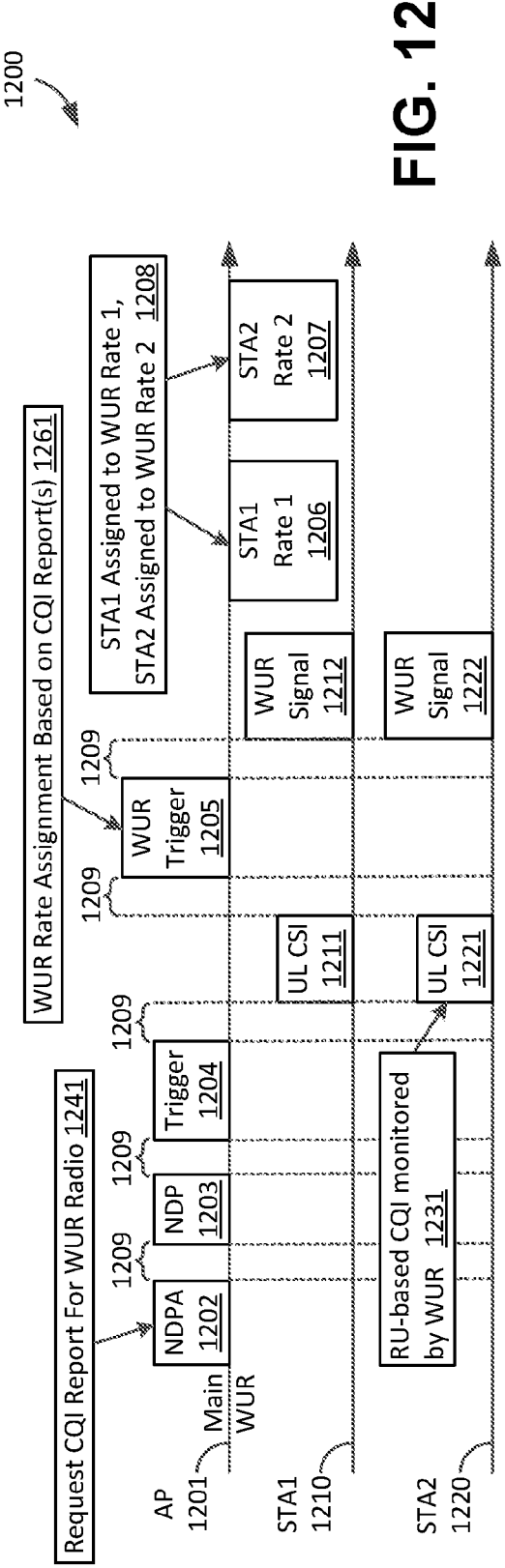

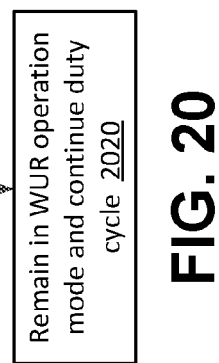
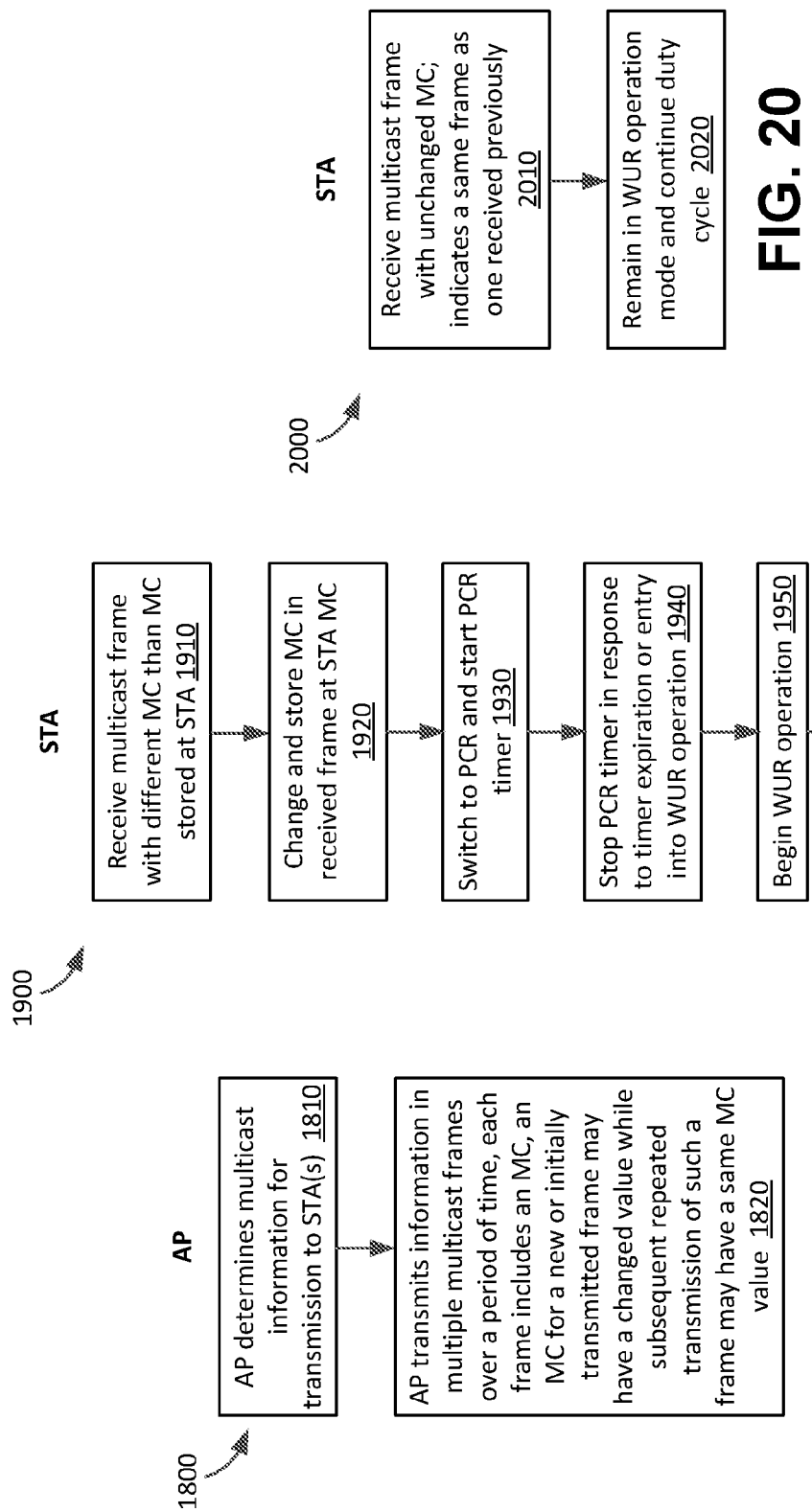
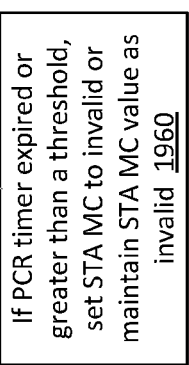

CLOSED LOOP TRANSMISSIONS ASSOCIATED WITH WAKE-UP RADIOS

CROSS-REFERENCE TO RELATED APPLICATIONS

This application is the U.S. National Stage, under 35 U.S.C. § 371, of International Application No. PCT/US2018/031102 filed May 4, 2018, which claims priority to U.S. Provisional Patent Application Ser. No. 62/501,892, filed May 5, 2017 and U.S. Provisional Patent Application Ser. No. 62/595,750, filed Dec. 7, 2017, each of which is entitled "CLOSED LOOP TRANSMISSIONS ASSOCIATED WITH WAKE-UP RADIOS," and each of which is incorporated herein by reference in its entirety.

BACKGROUND

In Wake-Up Radio (WUR) scenarios (e.g., where power-saving at non-access point (non-AP) devices such as, for example, non-AP stations (non-AP STAs) may be a goal), there may be a number of downlink (DL) transmissions from one or more APs that may be directed to one or more non-AP STAs. There may be a smaller number (e.g., a number less than the aforementioned number of DL transmissions) of uplink (UL) transmissions from one or more non-AP STAs to one or more APs. One or more closed loop transmission schemes may be used in WUR scenarios, such as beamforming, antenna selection, rate selection, Modulation Coding Scheme (MCS) selection, WUR narrow band channel selection, etc.

SUMMARY

Methods, systems, and apparatuses are disclosed for operating a wireless transmit/receive unit (WTRU) in a wake-up radio (WUR) state and receiving a (WUR) frame from an access point (AP). A WUR frame may include a multicast counter (MC) field. A determination may be made whether a received MC value in a received MC field is a same value as a stored MC value. Where a received MC value is the same value as a stored MC value, the WTRU may operate in the WUR state. Where a received MC value is not the same value as a stored MC value, the WTRU may operate in a primary connectivity radio (PCR) state. WTRUs may operate according to a duty cycle that may have an "off" period and an "on" period. A WTRU's duty cycle may be synchronized with one or more other duty cycles associated with one or more other WTRUs. When a received MC value is not the same value as an MC value stored at a WTRU, the WTRU may initiate a PCR timer. A WTRU may determine that a PCR timer value has met one or more thresholds and may responsively enter a WUR state, enter a PCR state, and/or invalidate a stored MC value.

BRIEF DESCRIPTION OF THE DRAWINGS

FIG. 10 illustrates another exemplary channel selection procedure.

FIG. 11 illustrates an exemplary rate selection procedure.

FIG. 12 illustrates another exemplary rate selection procedure.

FIG. 18 illustrates a block diagram representing another exemplary method.

FIG. 19 illustrates a block diagram representing another exemplary method.

FIG. 20 illustrates a block diagram representing another exemplary method.

DETAILED DESCRIPTION

Figure 1A:
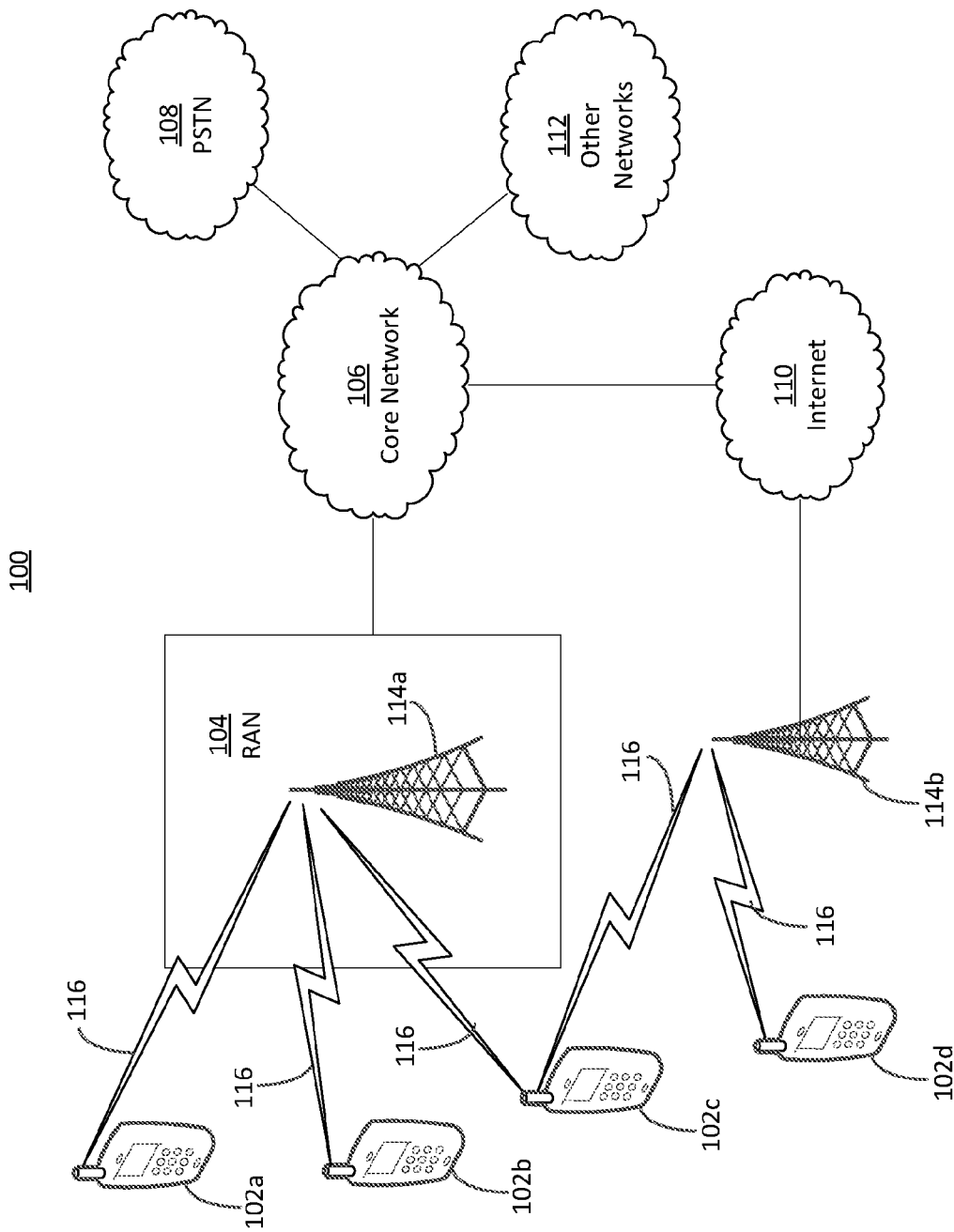
FIG. 1A illustrates system diagram of an exemplary communications system.

FIG. 1A is a diagram illustrating an exemplary communications system 100. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, communications systems 100 may employ one or more channel access methods that may include any one or more of, and/or any combination of, code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and any other type of channel access method.

As shown in FIG. 1A, communications system 100 may include wireless transmit/receive units (WTRUs) 102a, 102b, 102c, 102d, RAN 104, CN 106, public switched telephone network (PSTN) 108, Internet 110, and other networks 112. It will be appreciated that the disclosed examples contemplate any number of WTRUs, base stations, networks, and/or network elements. Each of WTRUs 102a, 102b, 102c, 102d may be any one or more of, and/or any combination of, a device configured to operate and/or communicate in a wireless environment. WTRUs 102a, 102b, 102c, 102d, any of which may be referred to as a "station" and/or a "STA", may be configured to transmit and/or receive wireless signals and may include any one or more of, and/or any combination of, a user equipment (UE), a mobile station, a fixed or mobile subscriber unit, a sub-scription-based unit, a pager, a cellular telephone, a personal digital assistant (PDA), a smartphone, a laptop, a netbook, a personal computer, a wireless sensor, a hotspot, a Mi-Fi device, an Internet of Things (IoT) device, a watch, any type of wearable device, a head-mounted display (HMD), a vehicle, a drone, a medical device, a medical application (e.g., remote surgery), an industrial device, an industrial application (e.g., a robot and/or other wireless devices operating in an industrial and/or an automated processing chain contexts), a consumer electronics device, a device operating on commercial and/or industrial wireless networks, and any other type of device that may be configured to transmit and/or receive wireless signals. Any of WTRUs 102a, 102b, 102c and 102d may be interchangeably referred to as a UE.

Communications systems 100 may also include base station 114a and/or base station 114b. Each of base stations 114a, 114b may be any type of device configured to wirelessly interface with at least one of WTRUs 102a, 102b, 102c, 102d to facilitate access to one or more communication networks, such as CN 106, Internet 110, and/or other networks 112. Each of base stations 114a, 114b may be any one or more of, and/or any combination of, a base transceiver station (BTS), a Node-B, an eNode B, a Home Node B, a Home eNode B, a next generation NodeB (gNB), a NR NodeB, a site controller, an access point (AP), a wireless router, and any other type of device that may perform one or more functions of a base station. While base stations 114a, 114b are each depicted as a single element, it will be appreciated that base stations 114a, 114b may include any number of interconnected base stations and/or network elements.

Base station 114a may be part of RAN 104, which may also include other base stations and/or network elements (that may not be shown), such as a base station controller (BSC), a radio network controller (RNC), relay nodes, etc. Base station 114a and/or base station 114b may be configured to transmit and/or receive wireless signals on one or more carrier frequencies, which may be referred to as a cell. Such frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, a cell associated with base station 114a may be divided into three sectors. Base station 114a may include three transceivers, e.g., one for each sector of the cell. Base station 114a may employ multiple-input multiple output (MIMO) technology and/or may utilize multiple transceivers for each sector of the cell. For example, beamforming may be used to transmit and/or receive signals in desired spatial directions.

Base stations 114a, 114b may communicate with one or more of WTRUs 102a, 102b, 102c, 102d over air interface 116, which may be any suitable wireless communication link (e.g., radio frequency (RF), microwave, centimeter wave, micrometer wave, infrared (IR), ultraviolet (UV), visible light, etc.). Air interface 116 may be established using any suitable radio access technology (RAT).

Communications system 100 may be a multiple access system and may employ any one or more of, and/or any combination of, channel access schemes, such as CDMA, TDMA, FDMA, OFDMA, SC-FDMA, and any other type of channel access scheme. For example, base station 114a in RAN 104 and WTRUs 102a, 102b, 102c may implement a radio technology such as Universal Mobile Telecommunications System (UMTS) Terrestrial Radio Access (UTRA), which may establish air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

Base station 114a and WTRUs 102a, 102b, 102c may implement a radio technology such as Evolved UMTS Terrestrial Radio Access (E-UTRA) that may establish air interface 116 using Long Term Evolution (LTE) and/or LTE-Advanced (LTE-A) and/or LTE-Advanced Pro (LTE-A Pro).

Base station 114a and WTRUs 102a, 102b, 102c may implement a radio technology such as NR Radio Access that may establish air interface 116 using New Radio (NR).

Base station 114a and WTRUs 102a, 102b, 102c may implement multiple radio access technologies. For example, base station 114a and WTRUs 102a, 102b, 102c may implement LTE radio access and NR radio access together, for instance using dual connectivity (DC) principles. Thus, an air interface utilized by WTRUs 102a, 102b, 102c may be characterized by multiple types of radio access technologies and/or transmissions sent to/from multiple types of base stations (e.g., an eNB and a gNB).

Base station 114a and WTRUs 102a, 102b, 102c may implement radio technologies such as any one or more of, and/or any combination of, IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and any other type of radio technology.

Base station 114b in FIG. 1A may be any one or more of, and/or any combination of, a wireless router, a Home Node B, a Home eNode B, an access point, and any other type of device that may perform one or more base station functions. Base station 114b may utilize any suitable RAT for facilitating wireless connectivity in a localized area, including any one or more of, and/or any combination of, a place of business, a home, a vehicle, a campus, an industrial facility, an air corridor (e.g., for use by drones), a roadway, and any other type of RAT. Base station 114b and WTRUs 102c, 102d may implement a radio technology such as IEEE 802.11 to establish a wireless local area network (WLAN). Base station 114b and WTRUs 102c, 102d may implement a radio technology such as IEEE 802.15 to establish a wireless personal area network (WPAN). Base station 114b and WTRUs 102c, 102d may also, or instead, utilize a cellular-based RAT (e.g., WCDMA, CDMA2000, GSM, LTE, LTE-A, LTE-A Pro, NR, etc.) to establish a picocell or femtocell. As shown in FIG. 1A, base station 114b may have a direct connection to Internet 110. Thus, base station 114b may not be required to access Internet 110 via CN 106.

RAN 104 may be in communication with CN 106 that may be any type of network configured to provide voice, data, applications, and/or voice over internet protocol (VoIP) services to one or more of WTRUs 102a, 102b, 102c, 102d. Such data may have varying quality of service (QoS) requirements, including any one or more of, and/or any combination of, differing throughput requirements, latency requirements, error tolerance requirements, reliability requirements, data throughput requirements, mobility requirements, and any other type of QoS requirement. CN 106 may provide call control, billing services, mobile location-based services, pre-paid calling, Internet connectivity, video distribution, etc., and/or may perform high-level security functions, such as user authentication. RAN 104 and/or CN 106 may be in direct or indirect communication with other RANs that employ a same RAT as RAN 104 or a different RAT. For example, in addition to being connected to RAN 104, which may be utilizing a NR radio technology, CN 106 may also be in communication with another RAN employing GSM, UMTS, CDMA 2000, WiMAX, E-UTRA, and/or other WiFi radio technology.

CN 106 may also serve as a gateway for WTRUs 102a, 102b, 102c, 102d to access PSTN 108, Internet 110, and/or other networks 112. PSTN 108 may include circuit-switched telephone networks that may provide plain old telephone service (POTS). Internet 110 may include a global system of interconnected computer networks and devices that may use common communication protocols, such as transmission control protocol (TCP), user datagram protocol (UDP) and/or internet protocol (IP) in the TCP/IP internet protocol suite. Other networks 112 may include wired and/or wireless communications networks owned and/or operated by other service providers. For example, other networks 112 may include another CN connected to one or more RANs that may employ a same RAT as a RAN 104 or a different RAT.

Some or all of WTRUs 102a, 102b, 102c, 102d in communications system 100 may include multi-mode capabilities (e.g., WTRUs 102a, 102b, 102c, 102d may include multiple transceivers for communicating with different wireless networks over different wireless links). For example, WTRU 102c shown in FIG. 1A may be configured to communicate with base station 114a, which may employ a cellular-based radio technology, and/or with base station 114b, which may employ an IEEE 802 radio technology.

Figure 1B:
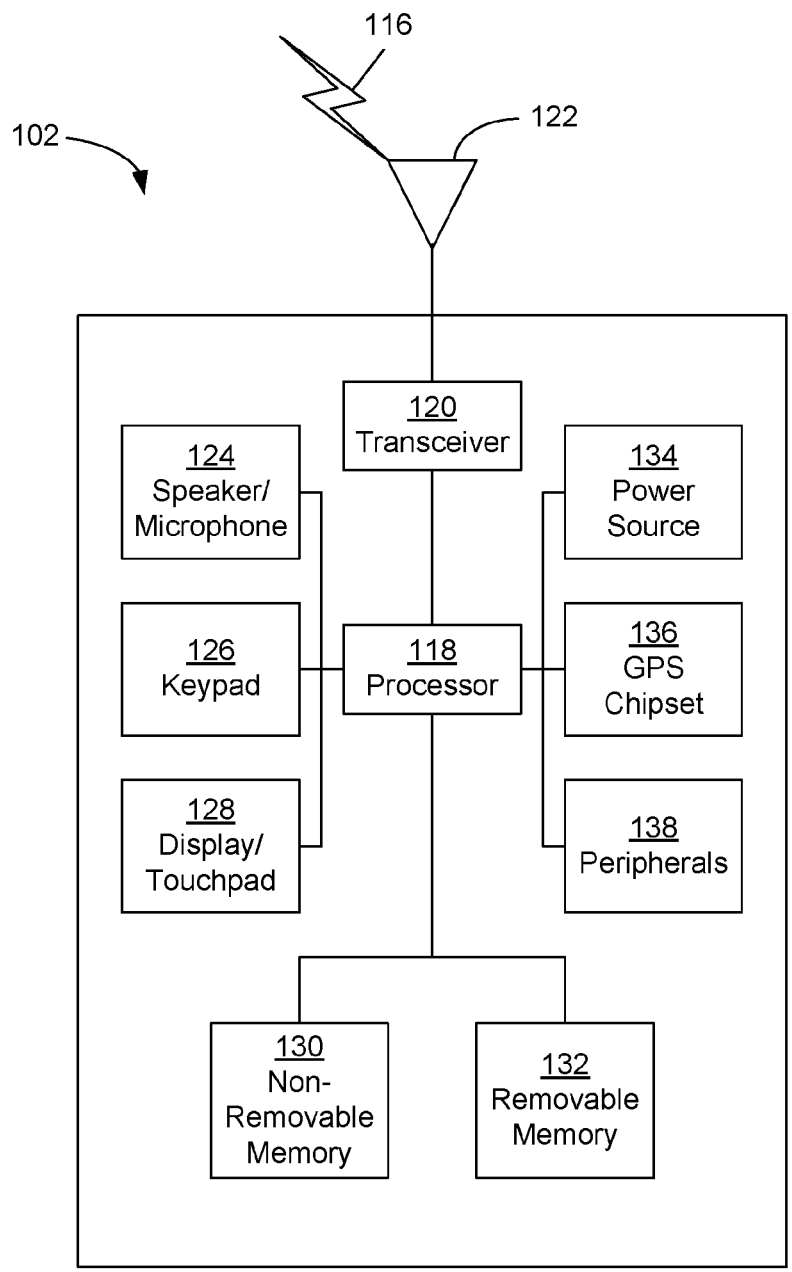
FIG. 1B is a system diagram of an example wireless transmit/receive unit (WTRU) that may be used within the communications system illustrated in FIG. 1A.

FIG. 1B is a system diagram illustrating example WTRU 102. WTRU 102 may include processor 118, transceiver 120, transmit/receive element 122, speaker/microphone 124, keypad 126, display/touchpad 128, non-removable memory 130, removable memory 132, power source 134, global positioning system (GPS) chipset 136, and/or other peripherals 138, among others. It will be appreciated that WTRU 102 may include any sub-combination of the foregoing elements while remaining consistent with the instant disclosure.

Processor 118 may be any one or more of, and/or any combination of, a general-purpose processor, a special purpose processor, a conventional processor, a digital signal processor (DSP), a microprocessor, a microprocessor in association with a DSP core, a controller, a microcontroller, an Application Specific Integrated Circuit (ASIC), a Field Programmable Gate Arrays (FPGA) circuit, any other type of integrated circuit (IC), a state machine, and any other type of processor. Processor 118 may perform signal coding, data processing, power control, input/output processing, and/or any other functionality that enables WTRU 102 to operate in a wireless environment. Processor 118 may be coupled to transceiver 120, which may be coupled to transmit/receive element 122. Processor 118 and transceiver 120 may be separate components or may be integrated together in an electronic package or chip.

Transmit/receive element 122 may be configured to transmit signals to and/or receive signals from a base station (e.g., base station 114a) over air interface 116. Transmit/receive element 122 may be an antenna configured to transmit and/or receive RF signals. Transmit/receive element 122 may be an emitter/detector configured to transmit and/or receive IR, UV, and/or visible light signals, for example. Transmit/receive element 122 may also, or instead, be configured to transmit and/or receive both RF and light signals. Transmit/receive element 122 may be configured to transmit and/or receive any combination of wireless signals.

Transmit/receive element 122 may be a single element or any number and/or combination of transmit/receive elements 122. For example, WTRU 102 may employ MIMO technology. WTRU 102 may include two or more transmit/receive elements 122 (e.g., multiple antennas) for transmitting and/or receiving wireless signals over air interface 116.

Transceiver 120 may be configured to modulate signals that may be transmitted by transmit/receive element 122 and/or to demodulate signals that may be received by transmit/receive element 122. WTRU 102 may have multi-mode capabilities. Transceiver 120 may include multiple transceivers that may enable WTRU 102 to communicate via multiple RATs, such as NR and IEEE 802.11.

Processor 118 of WTRU 102 may be coupled to, and may receive user input data from, speaker/microphone 124, keypad 126, and/or display/touchpad 128 (e.g., a liquid crystal display (LCD) display unit or organic light-emitting diode (OLED) display unit). Processor 118 may also output user data to speaker/microphone 124, keypad 126, and/or display/touchpad 128. Processor 118 may access information from, and/or store data in, any type of suitable memory, such as non-removable memory 130 and/or removable memory 132. Non-removable memory 130 may include random-access memory (RAM), read-only memory (ROM), a hard disk, and/or any other type of memory storage device. Removable memory 132 may include any one or more of, and/or any combination of, a subscriber identity module (SIM) card, a memory stick, a secure digital (SD) memory card, and any other type of removable memory. Processor 118 may access information from, and/or store data in, memory that is not physically located on WTRU 102, such as on a server and/or a home computer.

Processor 118 may receive power from power source 134 and may be configured to distribute and/or control power to other components in WTRU 102. Power source 134 may be any suitable device for powering WTRU 102. For example, power source 134 may include any one or more of, and/or any combination of, dry cell batteries (e.g., nickel-cadmium (NiCd), nickel-zinc (NiZn), nickel metal hydride (NiMH), lithium-ion (Li-ion), etc.), solar cells, fuel cells, and any other type of device suitable for powering WTRU 102.

Processor 118 may be coupled to GPS chipset 136 that may be configured to provide location information (e.g., longitude and latitude) regarding a current location of WTRU 102. In addition to, or instead of, information from the GPS chipset 136, WTRU 102 may receive location information over air interface 116 from a base station (e.g., base stations 114a, 114b) and/or determine its location based on timing of the signals being received from two or more nearby base stations. It will be appreciated that the WTRU 102 may acquire location information by way of any suitable location-determination method while remaining consistent with the instant disclosure.

Processor 118 may be coupled to other peripherals 138, which may include one or more software and/or hardware modules that may provide additional features, functionality, and/or wired and/or wireless connectivity. Peripherals 138 may include one or more of, and/or any combination of, an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and any other type of peripheral. Peripherals 138 may include one or more sensors. Such sensors may include any one or more of, and/or any combination of, a gyroscope, an accelerometer, a hall effect sensor, a magnetometer, an orientation sensor, a proximity sensor, a temperature sensor, a time sensor, a geolocation sensor, an altimeter, a light sensor, a touch sensor, a magnetometer, a barometer, a gesture sensor, a biometric sensor, a humidity sensor, and any other type of sensor.

WTRU 102 may include a full duplex radio for which transmission and/or reception of some or all of signals associated with particular subframes for either or both of uplink (UL) (e.g., for transmission) and downlink (DL) (e.g., for reception). Such transmission and/or reception may be concurrent and/or simultaneous. A full duplex radio may include an interference management unit that may reduce and/or substantially eliminate self-interference via either or both hardware (e.g., a choke) and signal processing via a processor (e.g., a separate processor and/or processor 118). WRTU 102 may include a half-duplex radio for which transmission and/or reception of some or all of the signals associated with particular subframes for either or both of UL (e.g., for transmission) and DL (e.g., for reception).

Figure 1C:
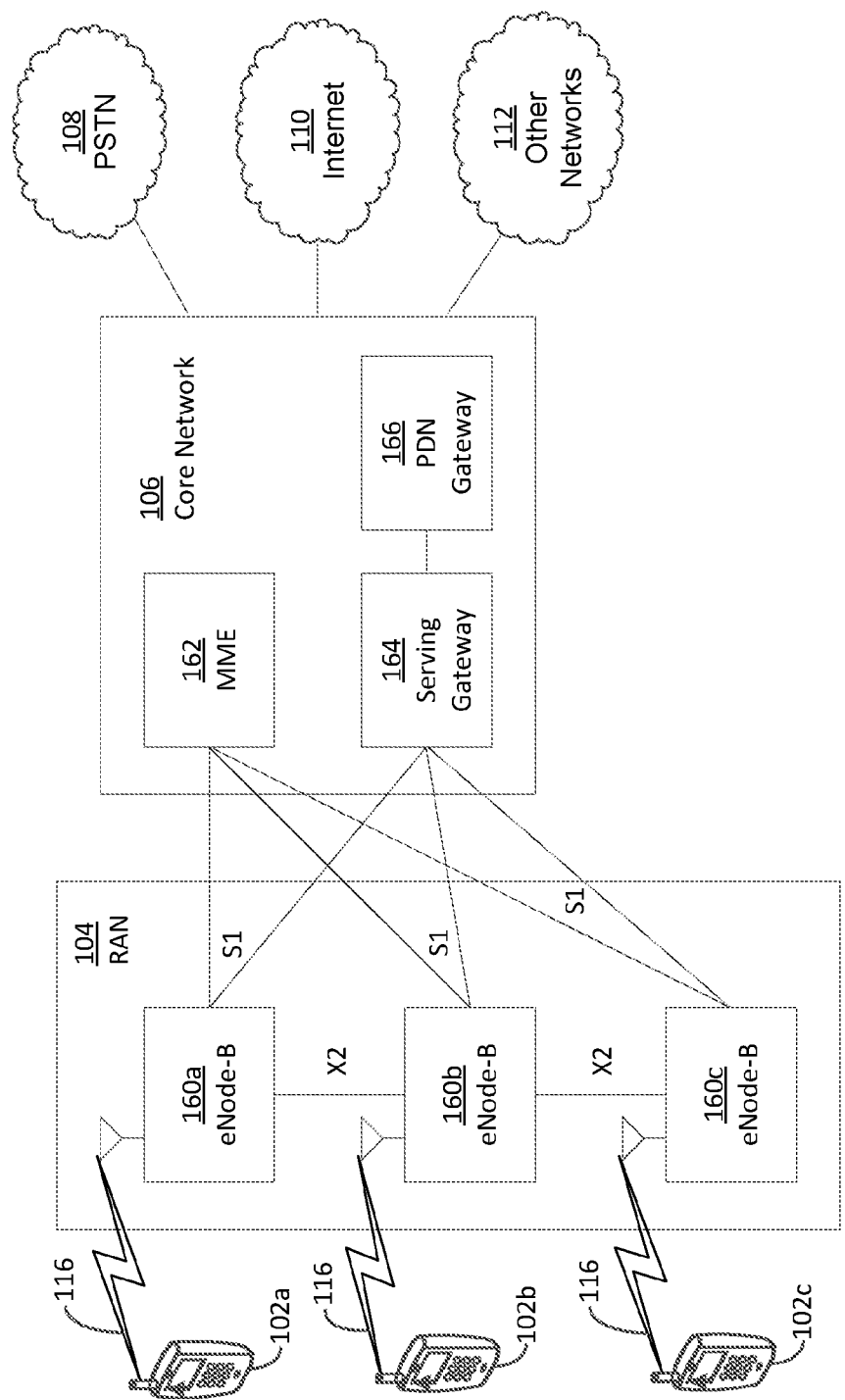
FIG. 1D is a system diagram of further example RAN and a further example CN that may be used within the communications system illustrated in FIG. 1A.
FIG. 1E illustrates exemplary wireless local area network (WLAN) devices.

FIG. 1C is a system diagram illustrating exemplary RAN 104 and CN 106. RAN 104 may employ an E-UTRA radio technology to communicate with WTRUs 102a, 102b, 102c over air interface 116. RAN 104 may also be in communication with CN 106.

RAN 104 may include eNode-Bs 160a, 160b, 160c, though it will be appreciated that the RAN 104 may include any number of eNode-Bs while remaining consistent with the instant disclosure. eNode-Bs 160a, 160b, 160c may each include one or more transceivers for communicating with WTRUs 102a, 102b, 102c over air interface 116. eNode-Bs 160a, 160b, 160c may implement MIMO technology. eNode-B 160a, for example, may use multiple antennas to transmit wireless signals to, and/or receive wireless signals from, WTRU 102a.

Each of eNode-Bs 160a, 160b, 160c may be associated with a particular cell and/or may be configured to handle any one or more of, and/or any combination of, radio resource management decisions, handover decisions, scheduling of users in the UL and/or DL, and any other type of eNode-B function. eNode-Bs 160a, 160b, 160c may communicate with one another over an X2 interface.

CN 106 may include mobility management entity (MME) 162, serving gateway (SGW) 164, and/or packet data network (PDN) gateway (PGW) 166. Any or all of such elements may be owned and/or operated by an entity other than the operator of CN 106.

MME 162 may be connected to each of eNode-Bs 160a, 160b, 160c in RAN 104 via an S1 interface and may serve as a control node. For example, MME 162 may be responsible for functions including any one or more of, and/or any combination of, authenticating users of WTRUs 102a, 102b, 102c, bearer activation/deactivation, selecting a particular serving gateway during an initial attach of WTRUs 102a, 102b, 102c, and any other type of MME function. MME 162 may provide a control plane function for switching between the RAN 104 and other RANs that may employ other radio technologies, such as GSM and/or WCDMA.

SGW 164 may be connected to each of eNode Bs 160a, 160b, 160c in RAN 104 via an S1 interface. SGW 164 may route and/or forward user data packets to/from WTRUs 102a, 102b, 102c. SGW 164 may perform other functions, including any one or more of, and/or any combination of, anchoring user planes during inter-eNode B handovers, triggering paging when DL data is available for WTRUs 102a, 102b, 102c, managing and/or storing contexts of WTRUs 102a, 102b, 102c, and any other type of gateway function.

SGW 164 may be connected to PGW 166 that may provide WTRUs 102a, 102b, 102c with access to packet-switched networks, such as Internet 110, to facilitate communications between WTRUs 102a, 102b, 102c and IP-enabled devices.

CN 106 may facilitate communications with other networks. For example, CN 106 may provide WTRUs 102a, 102b, 102c with access to circuit-switched networks, such as PSTN 108, to facilitate communications between WTRUs 102a, 102b, 102c and traditional land-line communications devices. CN 106 may include, or may communicate with, an IP gateway (e.g., an IP multimedia subsystem (IMS) server) that may serve as an interface between CN 106 and PSTN 108. CN 106 may provide WTRUs 102a, 102b, 102c with access to other networks 112 that may include other wired and/or wireless networks that may be owned and/or operated by other service providers Although one or more WTRUs may be described in the instant disclosure as a wireless terminal, it is contemplated that any such WTRU may use (e.g., temporarily or permanently) wired communication interfaces with a communication network. Note also that one or more disclosed networks, such as network 112, may be a WLAN.

A WLAN in Infrastructure Basic Service Set (BSS) mode may have an Access Point (AP) for a BSS and one or more stations (STAs) associated with the AP. The AP may have an access and/or an interface to a Distribution System (DS) and/or another type of wired/wireless network that may carry traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. Peer-to-peer traffic may be sent between (e.g., directly between) source and destination STAs with a direct link setup (DLS). A DLS may use an 802.11e DLS or an 802.11z tunneled DLS (TDLS). A WLAN using an Independent BSS (IBSS) mode may not have an AP, and one or more STAs (e.g., all of the STAs) within or using the IBSS may communicate directly with each other. The IBSS mode of communication may be referred to as an "ad-hoc" mode of communication.

When using the 802.11ac infrastructure mode of operation or a similar mode of operation, an AP may transmit a beacon on a fixed channel, such as a primary channel. A primary channel may be a fixed width (e.g., 20 MHz wide bandwidth) or a dynamically set width that may be set via signaling. A primary channel may be an operating channel of a BSS and may be used by STAs to establish a connection with an AP. Carrier Sense Multiple Access with Collision Avoidance (CSMA/CA) may be implemented, for example in in 802.11 systems. For CSMA/CA, STAs (e.g., every STA), including an AP, may sense a primary channel. If the primary channel is sensed/detected and/or determined to be busy by a particular STA, that particular STA may back off. One STA (e.g., only one station) may transmit at any given time in a given BSS.

High Throughput (HT) STAs may use a 40 MHz wide channel for communication, for example, via a combination of a primary 20 MHz channel and an adjacent or nonadjacent 20 MHz channel to form a 40 MHz wide channel.

Very High Throughput (VHT) STAs may support 20 MHz, 40 MHz, 80 MHz, and/or 160 MHz wide channels. 40 MHz, 80 MHz, and/or 160 MHz, channels may be formed by combining contiguous 20 MHz channels. A 160 MHz channel may be formed by combining eight (8) contiguous 20 MHz channels or by combining two (2) non-contiguous 80 MHz channels, which may be referred to as an 80+80 configuration. For an 80+80 configuration, data, after channel encoding, may be passed through a segment parser that may divide such data into two streams. Inverse Fast Fourier Transform (IFFT) processing and/or time domain processing may be performed on each of such streams separately. Such streams may be mapped on to the two 80 MHz channels and data may be transmitted using the two 80 MHz channels by a transmitting STA. At the receiver of a receiving STA, the above described operation for the 80+80 configuration may be reversed and the combined data may be sent to the Medium Access Control (MAC).

Sub 1 GHz modes of operation may be supported by 802.11af and 802.11ah. Channel operating bandwidths and/or carriers may be reduced in 802.11af and/or 802.11ah relative to channel operating bandwidths and/or carriers used in 802.11n and 802.11ac. 802.11af may support 5 MHz, 10 MHz, and/or 20 MHz bandwidths in the TV White Space (TVWS) spectrum. 802.11ah may support 1 MHz, 2 MHz, 4 MHz, 8 MHz, and/or 16 MHz bandwidths using non-TVWS spectrum. 802.11ah may support Meter Type Control and/or Machine-Type Communications (either of which may be referred to as "MTC"), such as MTC devices in a macro coverage area. MTC devices may have certain capabilities, for example, capabilities including support for (e.g., only support for) certain and/or limited bandwidths. MTC devices may include a battery with a battery life above a threshold (e.g., to maintain a very long battery life).

WLAN systems, which may support multiple channels and/or channel bandwidths, such as 802.11n, 802.11ac, 802.11af, and 802.11ah, may include a channel that may be designated as a primary channel. A primary channel may have a bandwidth equal to a largest common operating bandwidth supported by all STAs in a BSS. A bandwidth of such a primary channel may be set and/or limited by a STA, for example, from among all STAs operating in the respective BSS. Such a bandwidth of the primary channel may support a smallest bandwidth operating mode. For example, in 802.11ah implementations, a primary channel may be 1 MHz wide for STAs (e.g., MTC type devices) that support (e.g., only support) a 1 MHz mode, even if an AP and/or other STAs in the respective BSS support one or more of 2 MHz, 4 MHz, 8 MHz, 16 MHz, and any other channel bandwidth operating modes. Carrier sensing and/or Network Allocation Vector (NAV) settings may depend on a status of a primary channel. If a primary channel is busy, for example, due to an STA (e.g., that may support only a 1 MHz operating mode) transmitting to the AP, all available frequency bands may be considered busy even though a majority of such frequency bands may remain idle and available.

In the United States, available frequency bands that may be used by 802.11ah may be in the range of 902 MHz to 928 MHz. In Korea, available frequency bands may be in the range of 917.5 MHz to 923.5 MHz. In Japan, available frequency bands may be in the range of 916.5 MHz to 927.5 MHz. The total bandwidth available for 802.11ah may be may in the range of 6 MHz to 26 MHz depending on the country code.

Figure 1D:
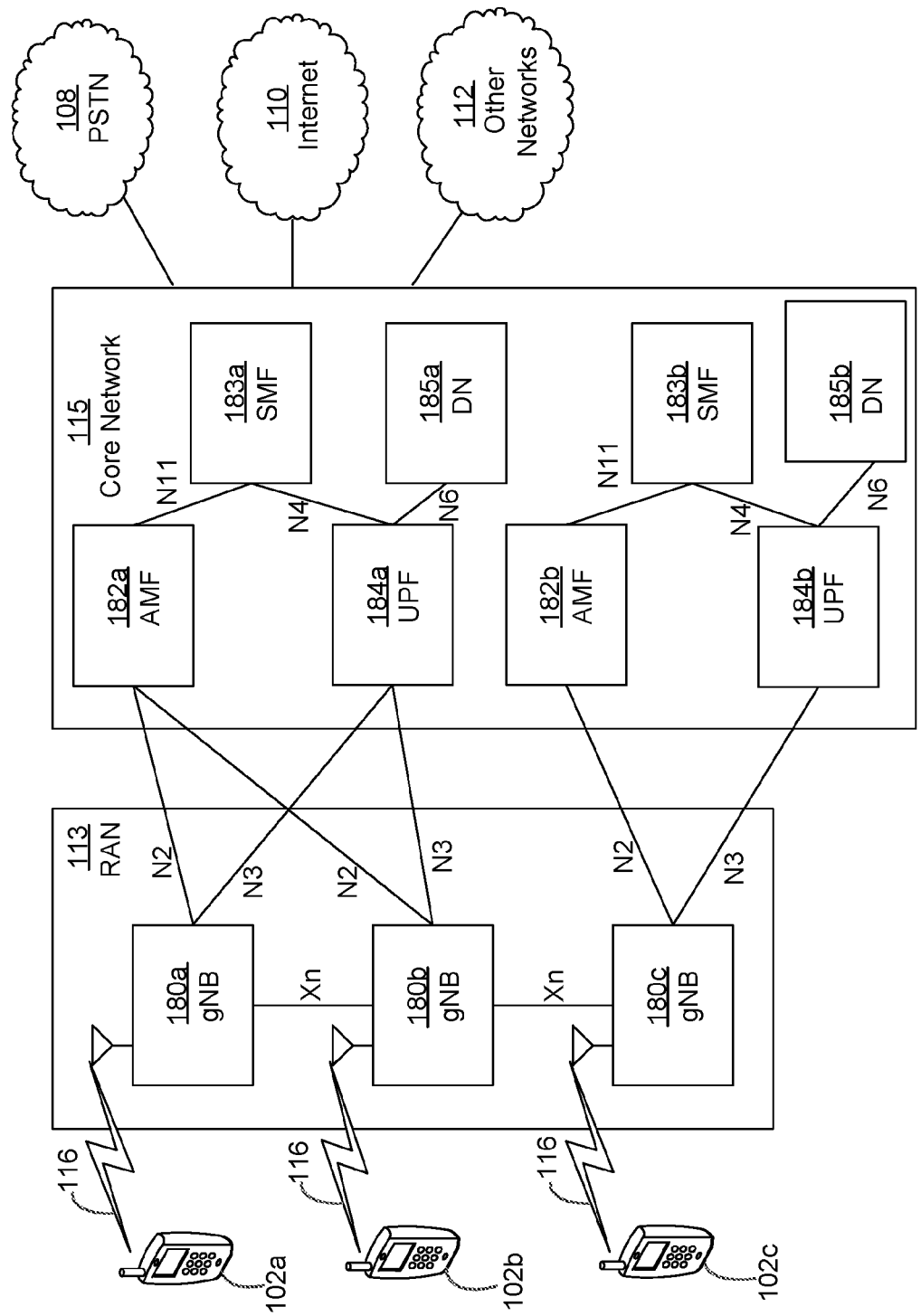

FIG. 1D is a system diagram illustrating exemplary RAN 113 and CN 115. RAN 113 may employ an NR radio technology to communicate with WTRUs 102a, 102b, 102c over air interface 116. RAN 113 may also be in communication with CN 115.

RAN 113 may include gNBs 180a, 180b, 180c, though it will be appreciated that RAN 113 may include any number of gNBs according to the instant disclosure. gNBs 180a, 180b, 180c may each include one or more transceivers for communicating with WTRUs 1022, 102b, 102c over air interface 116. gNBs 180a, 180b, 180c may implement MIMO technology. gNBs 180a, 108b may utilize beamforming to transmit signals to and/or receive signals from WTRUs 102a, 102b, 102c. Thus, gNB 180a, for example, may use multiple antennas to transmit wireless signals to, and/or receive wireless signals from, WTRU 102a. gNBs 180a, 180b, 180c may implement carrier aggregation technology. gNB 180a may transmit multiple component carriers to WTRU 102a. A subset of these component carriers may be on unlicensed spectrum while remaining component carriers may be on licensed spectrum. In such an example, gNBs 180a, 180b, 180c may implement Coordinated Multi-Point (CoMP) technology. WTRU 102a may receive coordinated transmissions from gNB 180a and gNB 180b (and/or gNB 180c).

WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of a wireless transmission spectrum. WTRUs 102a, 102b, 102c may communicate with gNBs 180a, 180b, 180c using subframe or transmission time intervals (TTIs) of various and/or scalable lengths (e.g., containing varying number of OFDM symbols and/or lasting varying lengths of absolute time).

gNBs 180a, 180b, 180c may be configured to communicate with WTRUs 102a, 102b, 102c in a standalone configuration and/or a non-standalone configuration. In an exemplary standalone configuration, WTRUs 102a, 102b, 102c may communicate with gNBs 180a, 180b, 180c without also accessing other RANs (e.g., such as eNode-Bs 160a, 160b, 160c described herein). In a standalone configuration, WTRUs 102a, 102b, 102c may utilize one or more of gNBs 180a, 180b, 180c as a mobility anchor point. In a standalone configuration, WTRUs 102a, 102b, 102c may communicate with gNBs 180a, 180b, 180c using signals in an unlicensed band.

In an exemplary non-standalone configuration, WTRUs 102a, 102b, 102c may communicate with and/or connect to gNBs 180a, 180b, 180c while also communicating with and/or connecting to another RAN, such as eNode-Bs 160a, 160b, 160c described herein. For example, WTRUs 102a, 102b, 102c may implement DC principles to communicate with one or more gNBs 180a, 180b, 180c and/or one or more eNode-Bs 160a, 160b, 160c, for example, substantially simultaneously. In an exemplary non-standalone configuration, eNode-Bs 160a, 160b, 160c may serve as a mobility anchor(s) for WTRUs 102a, 102b, 102c while gNBs 180a, 180b, 180c may provide additional coverage and/or throughput for servicing WTRUs 102a, 102b, 102c.

Each of gNBs 180a, 180b, 180c may be associated with a particular cell and/or may be configured to handle functions including any one or more of, and/or any combination of, radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and any other type of function that may be performed by a gNB. gNBs 180a, 180b, 180c may communicate with one another over an Xn interface.

CN 115 shown in FIG. 1D may include any one or more of, and/or any combination of, AMF 182a, 182b, UPF 184a,184b, Session Management Function (SMF) 183a, 183b, Data Network (DN) 185a, 185b, and any other type of management function. While each of such functions are depicted as part of CN 115 in FIG. 1D, it will be appreciated that any one or more of these elements may be owned and/or operated by an entity other than a CN operator.

AMF 182a, 182b may be connected to one or more of gNBs 180a, 180b, 180c in RAN 113 via an N2 interface and may serve as a control node. For example, AMF 182a, 182b may be responsible for functions that may include any one or more of, and/or any combination of, authenticating users of WTRUs 102a, 102b, 102c, support of network slicing (e.g., handling of different PDU sessions with different requirements), selecting a particular SMF 183a, 183b, management of a registration area, termination of NAS signaling, mobility management, and any other type of control node function. Network slicing may be used by one or both of AMF 182a and 182b in order to customize CN support for WTRUs 102a, 102b, 102c based on types of services utilized WTRUs 102a, 102b, 102c. For example, different network slices may be established for different use cases, including any one or more of, and/or any combination of, services relying on ultra-reliable low latency (URLLC) access, services relying on enhanced massive mobile broadband (eMBB) access, services for machine type communication (MTC) access, and any other type of use case. One or more of AMFs 182a, 182b may provide a control plane function for switching between RAN 113 and any other RANs that may employ other radio technologies, such as LTE, LTE-A, LTE-A Pro, and/or any non-3GPP access technologies such as WiFi.

One or more of SMFs 183a, 183b may be connected to one or more of AMF 182a, 182b in CN 115 via an N11 interface. One or more of SMFs 183a, 183b may also be connected to one or more of UPFs 184a, 184b in CN 115 via an N4 interface. One or more of SMFs 183a, 183b may select and/or control one or more of UPFs 184a, 184b and/or configure routing of traffic through one or more of UPFs 184a, 184b. One or more of SMFs 183a, 183b may perform other functions, including any one or more of, and/or any combination of, managing and/or allocating UE IP address, managing PDU sessions, controlling policy enforcement and QoS, providing downlink data notifications, and any other type of function. A PDU session type may be IP-based, non-IP based, and/or Ethernet-based.

One or more of UPFs 184a, 184b may be connected to one or more of gNBs 180a, 180b, 180c in RAN 113 via an N3 interface, which may provide one or more of WTRUs 102a, 102b, 102c with access to packet-switched networks, such as Internet 110, that may facilitate communications between one or more of WTRUs 102a, 102b, 102c and IP-enabled devices. One or more of UPFs 184, 184b may also, or instead, perform other functions, including any one or more of, and/or any combination of, routing and/or forwarding packets, enforcing user plane policies, supporting multi-homed PDU sessions, handling user plane QoS, buffering downlink packets, providing mobility anchoring, and any other type of function.

CN 115 may facilitate communications with other networks. For example, CN 115 may include, or may communicate with, an IP gateway (e.g., an IP multimedia subsystem (IMS) server) that may serve as an interface between CN 115 and PSTN 108. CN 115 may provide one or more of WTRUs 102a, 102b, 102c with access to one or more of other networks 112. One or more of other networks 112 may include wired and/or wireless networks that may be owned and/or operated by other service providers. One or more of WTRUs 102a, 102b, 102c may be connected to one or more of local Data Networks (DNs) 185a, 185b through one or more of UPFs 184a, 184b via an N3 interface to UPFs 184a, 184b and an N6 interface between UPFs 184a, 184b and DNs 185a, 185b.

One or more of, and/or any combination of, the functions described herein regarding any of WTRUs 102a-d, Base Stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other devices described herein may be performed by any one or more emulation devices. Such emulation devices may be any one or more of, and/or any combination of, devices configured to emulate one or more of, and/or any combination of, the functions described herein. For example, such emulation devices may be used to test other devices and/or simulate network and/or WTRU functions.

Emulation devices may be designed to implement one or more tests of one or more other devices in a lab environment and/or an operator network environment. For example, one or more emulation devices may perform one or more of, and/or any combination of, functions while being fully or partially implemented and/or deployed as part of a wired and/or wireless communication network in order to test other devices within a communication network. One or more emulation devices may perform the one or more of, and/or any combination of, functions while being temporarily implemented and/or deployed as part of a wired and/or wireless communication network. An emulation device may be directly coupled to another device for purposes of testing and/or may performing testing using over-the-air wireless communications.

One or more emulation devices may perform one or more of, and/or any combination of, functions while not being implemented and/or deployed as part of a wired and/or wireless communication network. For example, one or more emulation device may be utilized in a testing scenario in a testing laboratory and/or a non-deployed (e.g., testing) wired and/or wireless communication network in order to implement testing of one or more components. One or more emulation devices may be test equipment. Direct RF coupling and/or wireless communications via RF circuitry (e.g., that may include one or more antennas) may be used by one or more emulation devices to transmit and/or receive data.

Figure 1E:
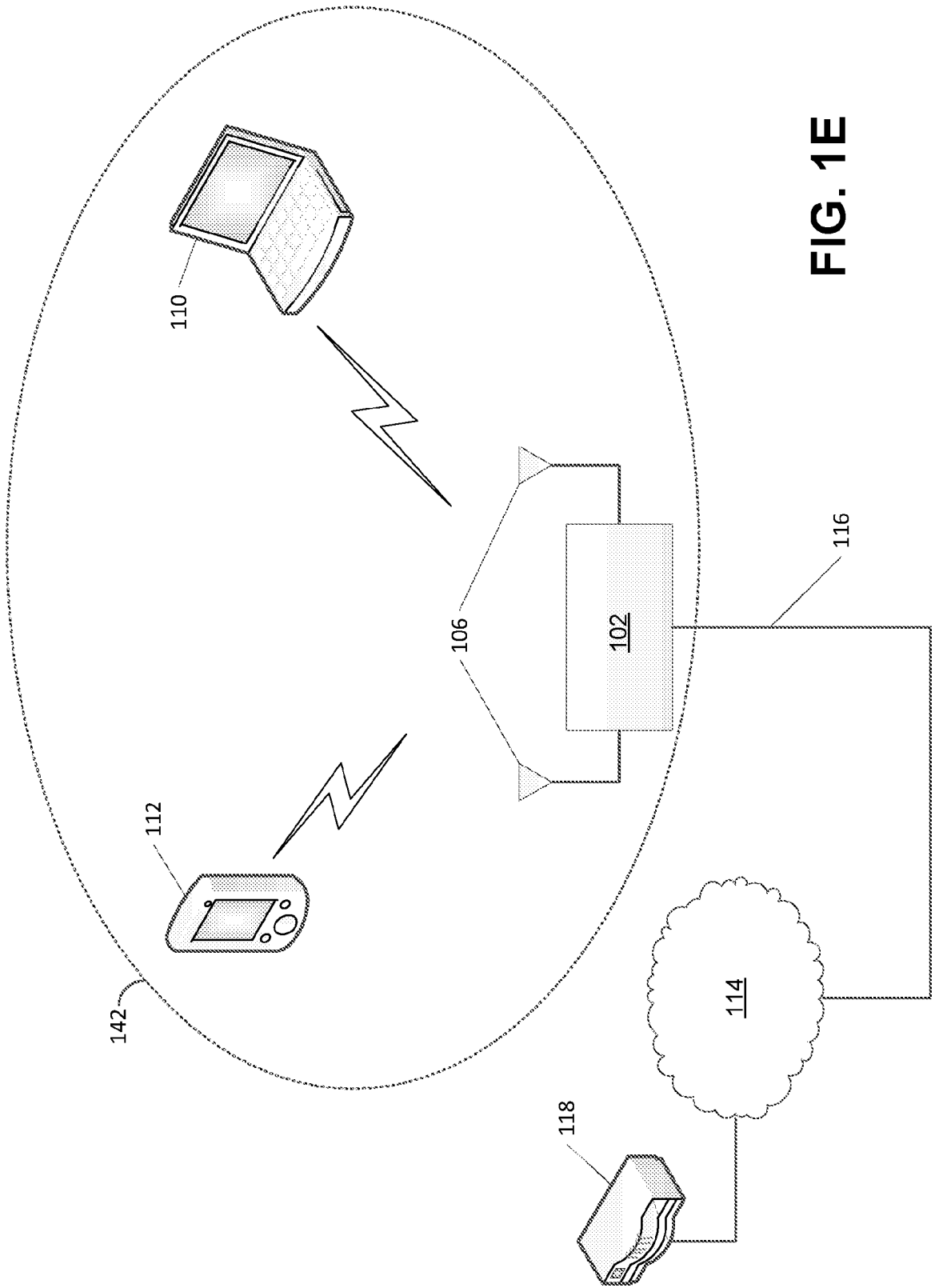

FIG. 1E illustrates exemplary wireless local area network (WLAN) devices. One or more of such devices may be used to implement one or more of the aspects disclosed herein. A WLAN may include, but is not limited to, access point (AP) 102, station (STA) 110, and STA 112. One or both of STAs 110 and 112 may be associated with AP 102. A WLAN may be configured to implement one or more protocols of the IEEE 802.11 communication standard, which may include one or more channel access schemes, such as direct sequence spread spectrum (DSSS), OFDM, OFDMA, etc. A WLAN may operate in a mode, for example, in an infrastructure mode, an ad-hoc mode, etc.

A WLAN operating in an infrastructure mode may comprise one or more APs communicating with one or more STAs. One or more APs and/or STAs associated with a particular AP may comprise a basic service set (BSS). For example, AP 102, STA 110, and/or STA 112 may comprise BSS 142. An extended service set (ESS) may comprise one or more APs (that may be associated with one or more BSSs) and/or STA(s) associated with the one or more APs. An AP may have access to, and/or interface with, distribution system (DS) 116, which may be wired and/or wireless and may carry traffic to and/or from the AP. Traffic to a STA in a WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to a destination, e.g., via DS 116 to network 114 to be sent to server 118. Traffic between STAs within a WLAN may be sent through one or more APs. For example, a source STA (e.g., STA 110) may have traffic intended for a destination STA (e.g., STA 112). STA 110 may send such traffic to AP 102. AP 102 may send such traffic to STA 112.

A WLAN may operate in an ad hoc mode. An ad hoc mode WLAN may be referred to as an independent basic service set (IBBS). In an ad hoc mode WLAN, STAs may communicate directly with each other (e.g., STA 110 may communicate with STA 112 without such communication being routed through an AP).

An IEEE 802.11 device (e.g., an IEEE 802.11 AP in a BSS) may use beacon frames to announce the existence of a WLAN network. An AP, such as AP 102, may transmit a beacon on a channel (e.g., that may be a fixed channel) such as a primary channel. A STA may use a channel, such as a primary channel, to establish a connection with an AP.

STA(s) and/or AP(s) may use a Carrier Sense Multiple Access with Collision Avoidance (CSMA/CA) channel access mechanism. In CSMA/CA, a STA and/or an AP may sense a primary channel. For example, if a STA has data to send, the STA may sense a primary channel. If the sensed primary channel is detected to be busy, the STA may back off. For example, a WLAN, or portion thereof, may be configured so that one or more particular STAs may transmit at a given time, e.g., in a given BSS. Channel access may include RTS and/or CTS signaling. An exchange of a request to send (RTS) frame may be transmitted by a sending device and a clear to send (CTS) frame may be sent by a receiving device. If an AP has data to send to a STA, the AP may send an RTS frame to the STA. If the STA is ready to receive data, the STA may respond with a CTS frame. A CTS frame may include a time value that may alert other STAs to hold off accessing the medium while the AP initiating the RTS may transmit its data. On receiving the CTS frame from the STA, the AP may send the data to the STA.

A device may reserve spectrum via a network allocation vector (NAV) field. In an IEEE 802.11 frame, a NAV field may be used to reserve a channel for a time period. A STA that may desire to transmit data may set a NAV to a time for which it may expect to use an associated channel. When such a STA sets a NAV, the NAV may be set for an associated WLAN or subset thereof (e.g., a BSS). One or more other STAs may count down the NAV until a NAV counter reaches a value equivalent to zero. When such a counter reaches a value of zero, NAV functionality may indicate to other STA(s) that the channel may now be available.

Devices in a WLAN, such as an AP or STA, may include one or more of a processor, a memory, a radio receiver, a transmitter (e.g., that may be combined in a transceiver), and/or an antenna (e.g., antennas 106 in FIG. 1E), etc. A processor function may include one or more processors. For example, a processor may include any one or more of, and/or any combination of, a general-purpose processor, a special purpose processor (e.g., a baseband processor, a MAC processor, etc.), a digital signal processor (DSP), an Application Specific Integrated Circuit (ASIC), a Field Programmable Gate Array (FPGA) circuit, any other type of integrated circuit (IC), a state machine, and any other type of processor that may perform one or more processing functions. Two or more processors may be integrated with each other or not integrated with each other. A processor (e.g., one or more processors of a processor function or a subset thereof) may be integrated with one or more other functions (e.g., other functions such as memory). A processor may perform any one or more of, and/or any combination of, signal coding, data processing, power control, input/output processing, modulation, demodulation, and/or any other functionality that may enable a device to operate in a wireless environment, such as the WLAN of FIG. 1E. A processor may be configured to execute processor executable code (e.g., instructions) including, for example, software and/or firmware instructions. A processor may be configured to execute computer readable instructions that may be included on one or more of the processor (e.g., a chipset that may include memory and/or a processor) and/or memory. Execution of such instructions may cause a device to perform any one or more of, and/or any combination of, the functions described herein.

A device may include one or more antennas. A device may employ multiple input multiple output (MIMO) techniques. Such one or more antennas may receive one or more radio signals. One or more processors associated with such a device may receive the one or more radio signals, e.g., via the one or more antennas. The one or more antennas may transmit one or more radio signals (e.g., based on one or more signals that may be sent from the processor).

A device may have a memory that may include one or more devices for storing programming and/or data, such as any one or more of, and/or any combination of, processor executable code and/or instructions (e.g., software, firmware, etc.), electronic data, databases, and any other type of digital information. A memory may include one or more memory units. Such one or more memory units may be integrated with one or more other functions (e.g., functions configured and/or included in the device, such as in the processor associated with the device). A memory may include any one or more of, and/or any combination of, a read-only memory (ROM) (e.g., erasable programmable read only memory (EPROM), electrically erasable programmable read only memory (EEPROM), etc.), random access memory (RAM), magnetic disk storage media, optical storage media, flash memory devices, and any other non-transitory computer-readable media that may be configured for storing information. A memory may be coupled to a processor. A processor may communicate with one or more memory entities, e.g., via a system bus, directly, etc.

A WLAN in an Infrastructure Basic Service Set (BSS) mode may include an Access Point (AP) associated with the BSS and one or more stations (STAs) associated with the AR The AP may have access, and/or an interface to a Distribution System (DS) that may be wireless and/or wired, or a combination thereof. The AP may also, or instead, have access and/or an interface to one or more wired and/or wireless networks that may be any other type of network that may transport traffic into and/or out of the BSS. Such a wired and/or wireless network may carry traffic into and/or out of the BSS. Traffic to one or more STAs (e.g., one or more of which may originate from outside the BSS) may arrive through the AP and may be delivered to the one or more STAs. Traffic originating from the one or more STAs (e.g., directed to destinations outside the BSS) may be sent to the AP (e.g., to be delivered to respective destinations).

Traffic between STA(s) within a BSS may be sent through an AP associated with the BSS. A source STA may send traffic to the AP. The AP may deliver the traffic to a destination STA. Traffic between the STAs (e.g., within the BSS) may be peer-to-peer traffic. Such peer-to-peer traffic may be sent (e.g., directly) between source and destination STAs, for example, with a direct link setup (DLS) that may use an 802.11e DLS and/or an 802.11z tunneled DLS (TDLS). A WLAN using an Independent BSS (IBSS) mode may not include AP(s) and/or STA(s) that may communicate directly with each other. A AP and/or STAs may use an "ad-hoc" mode of communication.

An AP may transmit a beacon on a fixed channel, such as a primary channel (e.g., using an 802.11ac infrastructure mode of operation). Such a channel may be 20 MHz wide. Such a channel may be an operating channel of a BSS. Such a channel may be used by one or more STAs to establish a connection with one or more APs. A channel access mechanism (e.g., in an 802.11 system) may be Carrier Sense Multiple Access with Collision Avoidance (CSMA/CA).

In a mode of operation utilizing a CSMA/CA channel access mechanism, one or more STAs and/or one or more APs (e.g., every STA, including any APs, in a BSS), may detect (e.g., sense) a fixed channel (e.g., a primary channel). If such a channel is detected to be busy, the one or more STAs and/or the one or more APs may back off. A STA (e.g., only one STA) may transmit at a given time in a given BSS.

High Throughput (HT) STAs may use a 40 MHz wide channel for communication (e.g., in an 802.11n system). Use of such a channel may be achieved, for example, by combining a primary 20 MHz channel with an adjacent 20 MHz channel to form a 40 MHz wide contiguous channel.

Very High Throughput (VHT) STAs may support any one or more of, and/or any combination of, a 20 MHz, a 40 MHz, an 80 MHz, and a 160 MHz wide channel (e.g., in an 802.11ac system). Such 40 MHz and/or 80 MHz channels may be formed, for example, by combining multiple 20 MHz channels (e.g., contiguous 20 MHz channels), in some examples, in a similar fashion as the 802.11n system described herein forms a 40 MHz wide channel.

A 160 MHz channel may be formed, for example, by combining eight (8) contiguous 20 MHz channels or by combining two non-contiguous 80 MHz channels. Such a 160 MHz channel configuration may be referred to as an 80+80 MHz configuration and/or an 80+80 configuration. In an example 80+80 configuration, data, after channel encoding, may be passed through a segment parser. A segment parser may divide such data into two streams. IFFT and/or time domain processing may be performed on such streams, for example, on each of the two streams individually. The resulting two processed streams may each be mapped to one of two channels. For example, a first processed stream may be mapped to a first channel of a set of two channels of an 80+80 configuration, while a second processed stream may be mapped to a second channel of a set of two channels of an 80+80 configuration. The data of the two streams may be transmitted, e.g., via the two channels. At a receiver, the foregoing operation may be reversed and the data of the two streams may be combined. This combined data may be sent to a MAC.

Sub 1 GHz modes of operation may be supported (e.g., by 802.11af, and/or 802.11ah). One or more channel operating bandwidths and/or carriers may be reduced (e.g., relative to carriers that may be used in 802.11n and/or 802.11ac). 802.11af may support 5 MHz, 10 MHz, and/or 20 MHz bandwidths, for example, in the TV White Space (TVWS) spectrum. 802.11ah may support 1 MHz, 2 MHz, 4 MHz, 8 MHz, and 16 MHz bandwidths, for example, in non-TVWS spectrum. Meter Type Control (MTC) devices (e.g., in an 802.11ah system) may be supported, for example, in a macro coverage area according to the instant disclosure. MTC devices may have limited capabilities. MTC devices may include support (e.g., only) for limited bandwidths. MTC devices may also, or instead, be designed to increase battery life.

WLAN systems may support multiple channels and/or channel widths, such as those described in the 802.11n, 802.11ac, 802.11af, and/or 802.11ah standards. WLAN systems (e.g., such as those having multi-channel and/or multi-channel width support) may include a channel designated as a primary channel. A primary channel may have a bandwidth substantially equal (e.g., equal) to a largest common operating bandwidth that may be supported by one or more STAs (e.g., all STAs) in a BSS. A bandwidth of a primary channel may be limited by a smallest bandwidth operating mode supported by one or more STAs (e.g., one or more STAs operating in a BSS).

For example, (e.g., in a non-limiting exemplary 802.11ah implementation) a primary channel may be 1 MHz wide if there is one or more STAs (e.g., one or more MTC type devices) that may support (e.g., only) a 1 MHz mode. In such an exemplary implementation, where any other APs and/or STAs in the BSS may support a 2 MHz, 4 MHz, 8 MHz, 16 MHz, and/or any other channel bandwidth operating mode than 1 MHz, a primary channel may be set to a smallest bandwidth supported by any one or more of the STAs and/or APs operating in the BSS, which in this example is a 1 MHz wide mode.

One or more carrier sensing settings (e.g., all carrier sensing settings) and/or one or more NAV settings (e.g., all NAV settings) may depend on a status of a primary channel. For example, if a primary channel is busy (e.g., because a STA supporting only a 1 MHz operating mode is transmitting to an AP), all available frequency bands may be considered busy, for example, where a majority of bands may remain idle and available.

Available frequency bands that may be used, for example, by 802.11ah implementations, may depend on a location. For example, available frequency bands that may be used, for example, by 802.11ah implementations, may range from 902 MHz to 928 MHz (e.g., in the United States), from 917.5 MHz to 923.5 MHz (e.g., in Korea), from 916.5 MHz to 927.5 MHz (e.g., in Japan), etc. A total bandwidth available for an exemplary 802.11ah implementation may be 6 MHz to 26 MHz, or any other bandwidth range, and may depend on a country code.

A quality of service provided to users may be enhanced according to the disclosed examples. For example, a quality of service that may be provided to a broad spectrum of users in a variety of usage scenarios (e.g., high-density scenarios in the 2.4 GHz and/or 5 GHz bands) may be enhanced according to the disclosed examples. The disclosed aspects may support dense deployments of APs and/or STAs, and/or their associated Radio Resource Management (RRM) technologies.

Applications for high efficiency WLAN (HEW) may include any one or more of, and/or any combination of, emerging usage scenarios such as data delivery for stadium events, high user density scenarios (e.g., train stations), enterprise environments, retail environments, scenarios that may depend on video delivery, wireless services for medical applications and any other type of usage scenario.

Measured traffic for a variety of applications may be prone to relatively short packets. For example, network applications may generate short packets. Such applications (that are not limited to network applications) may include one or more of virtual office applications, TCP ACK applications, video streaming ACK applications, device and/or controller applications (e.g., mice applications, keyboard applications, game control applications, etc.), access activity applications (e.g. probe requests, probe responses, etc.), network selection activity applications (e.g., probe requests, access network query protocol (ANQP), etc.), network management activity applications, (e.g., control frames, etc.), and any other applications that may generate short packets.

Multi-user (MU) features may include one or more of, or any combination of, UL OFDMA, DL OFDMA, UL MU-MIMO, and DL MU-MIMO. One or more means and/or mechanisms for multiplexing UL random access for different purposes may be designed and/or defined according to the instant disclosure.

Lower power operation for devices, such as 802.11 devices, may be set forth herein. For example, wake-up radio (WUR) operations that may be performed at a MAC layer and/or a PHY layer are set forth in the instant disclosure.

WUR operation bands may include 2.4 GHz and/or 5 GHz. WUR operation bands may be extended to Sub 1 GHz. A WUR may operate as a companion radio to a primary connectivity radio that may be used to transmit 802.11 packets (e.g., "regular" 802.11 packets and/or non-WUR 802.11 packets). A WUR may transmit packets that may carry control information (e.g., only control information). A WUR transmission may have low active receiver power consumption, for example, of less than one milliwatt. Reception of a wake-up packet by a WUR may cause a companion primary connectivity radio to wake up from sleep. A WUR may have a range that may be the same or greater than the range of a companion primary connectivity radio (e.g., when a primary connectivity radio is operating on at least 20 MHz payload bandwidth).

AP STAs and/or non-AP STAs may be associated with at least one WUR as a companion radio. For example, one or more WURs may be included in any usage scenario that may include any one or more of, and/or any combination of, an IoT device, a low power operation of a smart phone, a quick message/incoming call notification scenario, a quick status query/report, a configuration change scenario, a quick emergency/critical event report scenario, and any other type of usage scenario suitable for inclusion of one or more WURs.

One or more WUR-related negotiations may be performed in a main radio. Such negotiations may include any one or more of, and/or any combination of, a frequency band negotiation, a channel negotiation, a negotiation related to STA ID allocation in wake-up packets, a negotiation related to an indication of a required time for turning on a 802.11 radio, a negotiation related to an indication of a periodic WUR receiver on/off schedule, a negotiation regarding a definition of one or more WUR mode elements (e.g., to carry information in a current frame exchange and/or in another frame exchange), and any other WUR-related negotiation.

Figure 2A:
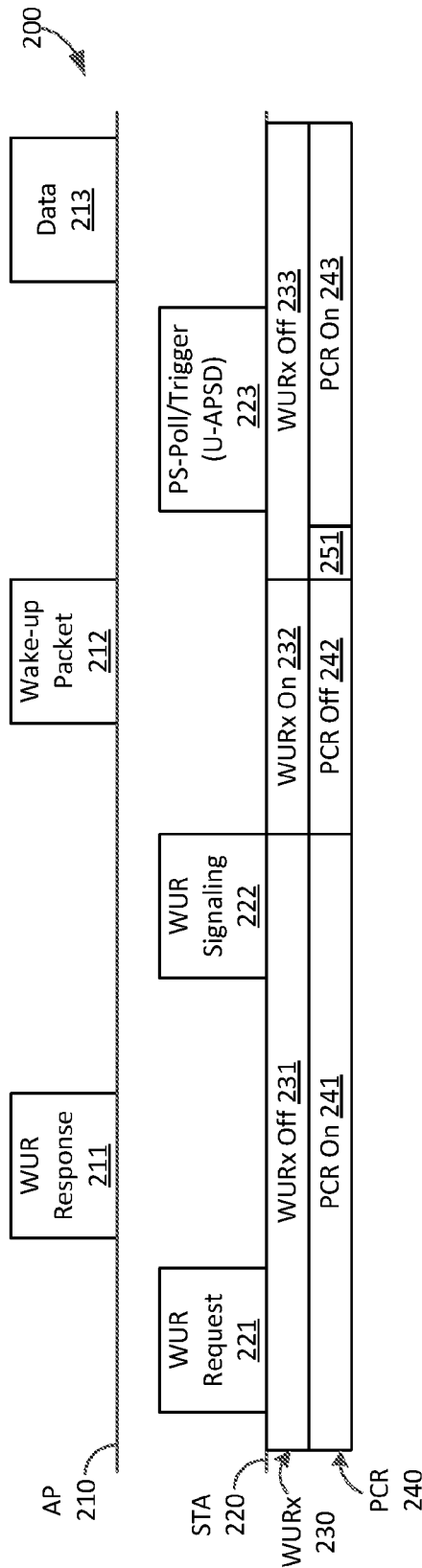
FIG. 2A illustrates an exemplary frame exchange and Wake-up Receiver (WUR) negotiation.

FIG. 2A illustrates example frame exchange and WUR negotiation 200. AP 210 may receive WUR request 221 from STA 220 during a period when WURx 230 may be off 231. AP 210 may transmit WUR response 211 to STA 220 during the period when WURx 230 may be off 231. STA 220 may perform WUR signaling 222 during the period when WURx 230 may be off 231. Such WUR signaling 222 may indicate or otherwise inform AP 210 that STA 220 may be entering a WUR state. The period when WURx 230 may be off may be a same, or similar, period to that when primary connectivity radio (PCR) 240 may be on 241. Note that "PCR," "802.11 radio," and "main radio" may be used interchangeably herein.

STA 220 may enter WURx on state 232 and PCR 240 off state 242. During such a period (e.g., period 232 and/or 242), AP 210 may transmit wake-up packet 212. Following, e.g., some amount of delay 251, STA 220 may enter PCR on state 243 and WURx off state 233, for example, according to, or based on, a preconfigured and/or dynamically determined schedule. While STA 220 may be in WURx off state 233, STA 220 may send PS-poll frame to AP 210 and/or trigger Unscheduled Asynchronous Power Save Delivery (U-APSD) 223.

Figure 2B:
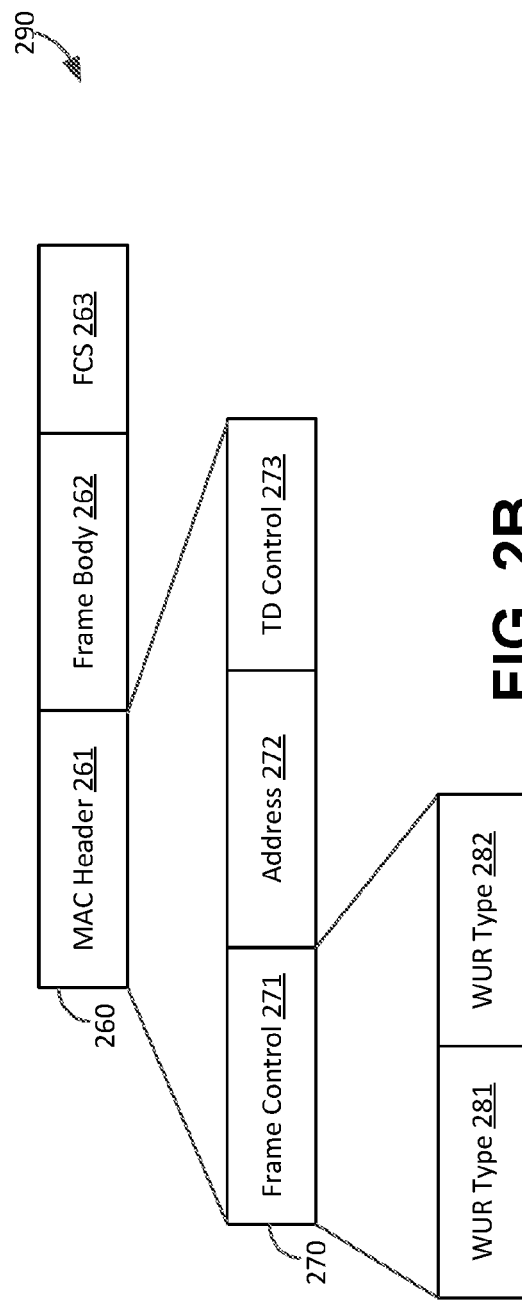
FIG. 2B illustrates an exemplary WUR frame format.

One or more WUR action frames may be used. Such one or more WUR action frames may have a WUR frame format, such as exemplary format 290 illustrated FIG. 2B. WUR action frame 260 may be transmitted over a WUR channel. A length of MAC header 261 of WUR action frame 260 may be fixed. MAC header 261 may include subfields 270 that may include any one or more of, and/or any combination of, a frame control subfield 271, an address subfield 272, a type dependent (TD) control subfield 273, and any other type of subfield.

Frame control subfield 271 of subfields 270 may include one or more WUR frame type subfields, such as WUR type subfield 281 and/or WUR type subfield 282. Type subfield 281 and/or type subfield 282 may each identify and/or indicate a WUR frame type. For example, type subfield 281 may indicate a WUR beacon frame type and or type subfield 282 may indicate a WUR wake-up frame. Any one or more frame types may be indicated by each of any one or more of, and/or any combination of, a type subfield that may be included in a frame control subfield.

Type dependent (TD) control subfield 273 of MAC header 260 may include type dependent control information. WUR action frame 260 may include one or more frame body fields, such as frame body field 262. WUR action frame 260 may also, or instead, include one or more frame check sequence (FCS) fields, such as FCS field 263.

In an exemplary WUR scenario, in an effort to save power at a non-AP STA side, there may be one or more (e.g., many) downlink transmissions from an AP to non-AP STAs while there may be limited or no uplink transmissions from such non-AP STAs to the AP. Closed loop transmission schemes, such as beamforming, antenna selection, rate or Modulation Coding Scheme (MCS) selection, WUR narrow band channel selection etc., may be used in such an exemplary WUR scenario.

A WUR may be in a duty cycle mode (e.g., not always on). A duty cycle may be defined as a time period T, where $T=T_{on}+T_{off}$, where $T_{on}$ represents a duration of an "on"

period of the duty cycle and $T_{off}$ represents a duration of an "off" period of the duty cycle.

Figure 3:
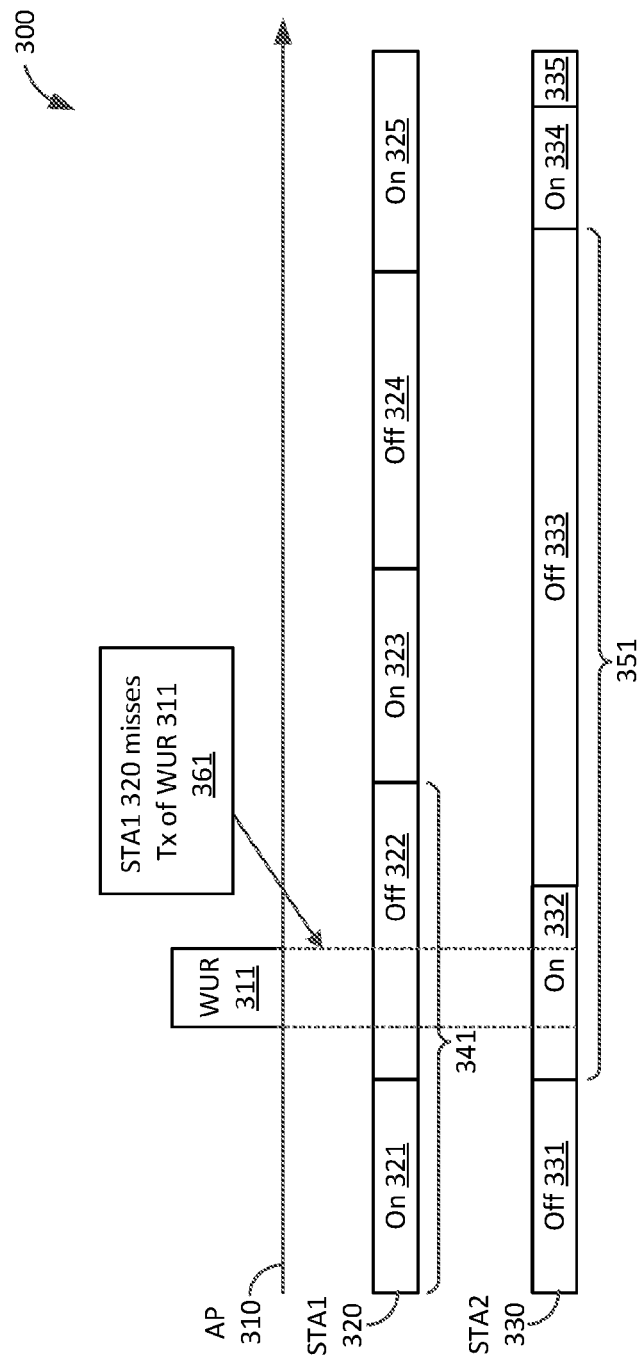
FIG. 3 illustrates an exemplary frame exchange including a multicast transmission over a WUR channel.

Multicast and/or broadcast transmissions may be transmitted over a WUR channel. FIG. 3 illustrates example frame exchange 300 that may represent one or more exemplary multicast and/or broadcast transmissions that may performed, for example, when one or more STAs may be in a duty cycle mode. A duty cycle mode may cause, for example, STA1 320 to be in on state 321, off state 322, on state 323, off state 324, and/or on state 325. Duty cycle period 341 may be a duty cycle period used by STA1 320. A duty cycle mode may cause, for example, STA2 330 to be in off state 331, on state 332, off state 333, on state 334, and/or off state 335. Duty cycle period 351 may be a duty cycle period used by STA2 330.

AP 310 may attempt to transmit WUR frame 311 to one or more of SAT1 320 and STA2 330. STA2 330 may receive WUR frame 311 because it may be in on state 332 when WUR frame 311 is transmitted. STA1 320 may not receive WUR frame 311 at 361 because it may be in off state 322 when WUR frame 311 is transmitted.

One or more closed loop transmission schemes may be implemented according to the instant disclosure. Measurements such as any one or more of, and/or any combination of, channel state information (CSI), signal to noise ratio (SNR), signal to noise and interference ratio (SINR), and any other type of measurement in a main radio may be reused and/or applied at a WUR radio. Information that may be related to one or more closed loop schemes, such as beamforming (BF), rate adaptation, etc., may be included in one or more negotiation frames. Such information that may be related to one or more closed loop schemes may include, for example, channel information that may be used for WUR channel selection, WUR beamforming, and/or WUR rate selection. Such information that may be related to one or more closed loop schemes may also, or instead, include, for example, WUR radio delta factor and/or a main radio delta factor (e.g., that may be used to compensate one or more RF chain differences).

A WLAN device may include multiple sets (e.g., two sets) of radios and/or RF chains (e.g., due to an addition of a WUR). A first such set may be for a WLAN main radio while a second such set may be for a WUR. Multiple (e.g., two) sets of radios may share a same set of antennas. Measurements taken on one radio (e.g., of a set of multiple radios and/or RF chains of a WLAN device) may be applied to another radio, for example, by using a set of one or more delta factors.

Figure 4:
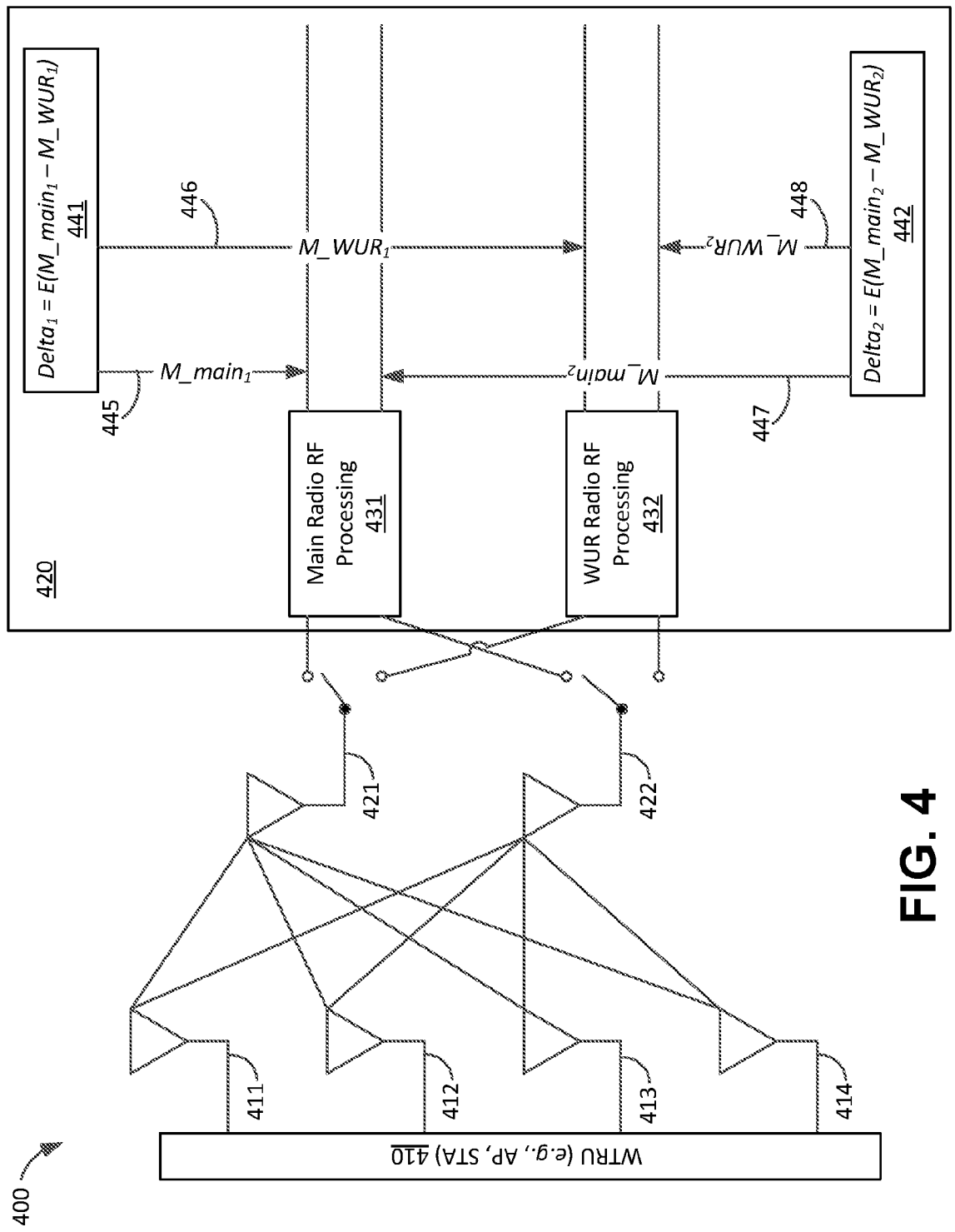
FIG. 4 illustrates an exemplary system that may utilize one or more delta factors.

FIG. 4 illustrates exemplary system 400. WTRU 410, which may be either or both of an AP and a STA, may include multiple antennas, for example, antennas 411, 412, 413, 414. WTRU 420, which may be either or both of an AP and a STA, may include multiple antennas, for example, antennas 421, 422.

WTRU 420 may be a receiver (e.g., either or both of an AP and a STA) of an exemplary communication. Two or more sets of RF chains may share a same set of antennas at a receiver and/or at a transmitter.

A physical channel (e.g., an over the air physical channel) may remain a same physical channel, e.g., regardless of any two or more RF chains that may be used at a receiver. One or more channel measurements may be performed at a baseband. RF chain impairments may be indicated by such one or more channel measurements. One or more channel measurements performed at a main radio (e.g., main radio RF processing function 431) may differ from one or more channel measurements that may be performed at a WUR radio (e.g., WUR radio RF processing function 432).

Transmitter WTRU 410 may reuse a channel measurement that may have been measured by main radio RF processing function 431 to predict a channel condition that may be observed by WUR baseband. Transmitter WTRU 410 may use main radio to exchange one or more communications about channel state information that may be used to configure transmissions with WUR radio RF processing function 432. A closed loop WUR configuration may be possible.

Differences between measurements performed by each of two or more radios (e.g., main radio RF processing function 431 and WUR radio RF processing function 432) may be referred to as delta factors. One or more delta factors may be determined at, received by, and/or provided to a transmitter (e.g., WTRU 410) so that such a transmitter may, for example, use such one or more differences indicated by the one or more delta factors to compensate for differences between measurements in a system, such as system 400.

One or more channel measurements on a first and second antenna (e.g., antenna 421 and 422) of a set of at least two antennas (or a first and second layer of a set of at least two layers) may use a main radio (e.g., main radio RF processing function 431) for such measurements. Such main radio measurements by such a first and second antenna (e.g., antenna 421 and 422) may be referred to herein, for non-limiting explanatory purposes only, as $M\_main_1$ and $M\_main_2$, respectively.

One or more channel measurements by a first and second antenna (e.g., antenna 421 and 422) of a set of at least two antennas (or a first and second layer of a set of at least two layers) may use a WUR radio (e.g., WUR radio RF processing function 432) for such measurements. Such WUR radio measurements by such a first and second antenna (e.g., antenna 421 and 422) may be referred to herein, for non-limiting explanatory purposes only, as $M\_WUR_1$ and $M\_WUR_2$, respectively.

One or more delta factors may be defined as, e.g., an expected result of $M\_main_x - M\_WUR_x$ on a receive antenna or receive layer. In exemplary system 400, example delta factors may be defined by equations 1 and 2.

$$Delta_1 = E(M\_main_1 - M\_SUR_1) \quad (1)$$

$$Delta_2 = E(M\_main_2 - M\_SUR_2) \quad (2)$$

System 400 may include $Delta_1$ factor 441 and $Delta_2$ factor 442 that may correspond to two receive RF processing functions, respectively. $Delta_1$ factor 441 may provide an RF process difference between 445 to main radio RF processing function 431 and 446 to WURx RF processing function 432. $Delta_2$ factor 442 may provide an RF process difference between 447 to main radio RF processing function 431 and 448 to WURx RF processing function 432. $Delta_1$ factor 441 may be calculated using one or more measurements observed through first antenna 421 and WUR RX processing function 432, $M\_WUR_1$ 446 and one or more measurements observed through first antenna 421 and main radio RX processing function 431, $M\_main_1$. $Delta_2$ factor 442 may be calculated using one or more measurements observed through second antenna 422 and WUR RX processing function 432, $M\_WUR_2$ 448 and one or more measurements observed through second antenna 422 and main radio RX processing function 431, $M\_main_2$.

More than two delta factors may be obtained and/or determined in examples that may include more than two receive antennas and/or more than two MIMO layers. Measurements contemplated herein include any one or more of, and/or any combination of, CSI, SNR, SINR, Received Signal Strength Indicator (RSSI), and any other type of measurement.

One or more delta factors associated with a first WUR channel may differ from one or more corresponding delta factors associated with a second WUR channel. One or more delta factors may be reported, e.g., per WUR channel. For example, where four WUR channels may be supported, narrow band delta factors associated with each of the four WUR channels may be reported.

Delta factors may not be sensitive to WUR channel frequencies. One or more wideband delta factors may be reported, for example, that may represent one or more delta factors that may be associated with all, or any subset, of applicable WUR channels.

One or more delta factors may be obtained and/or determined offline. Alternatively, or in addition, one or more delta factors may be hardcoded to a device. Alternatively, or in addition, one or more delta factors may be obtained online, for example, by switching on and off each radio set (e.g., main radio RF processing function 431 and WUR radio RF processing function 432) and comparing resulting measurements.

One or more delta factors may be exchanged by a transmitter and a receiver, such as WTRU 410 and WTRU 420, respectively. Such one or more delta factors may be exchanged via capability exchange. One or more delta factors may also, or instead, be exchanged by a transmitter and a receiver, such as WTRU 410 and WTRU 420, respectively, using one or more control frames and/or management frames.

Figure 5:
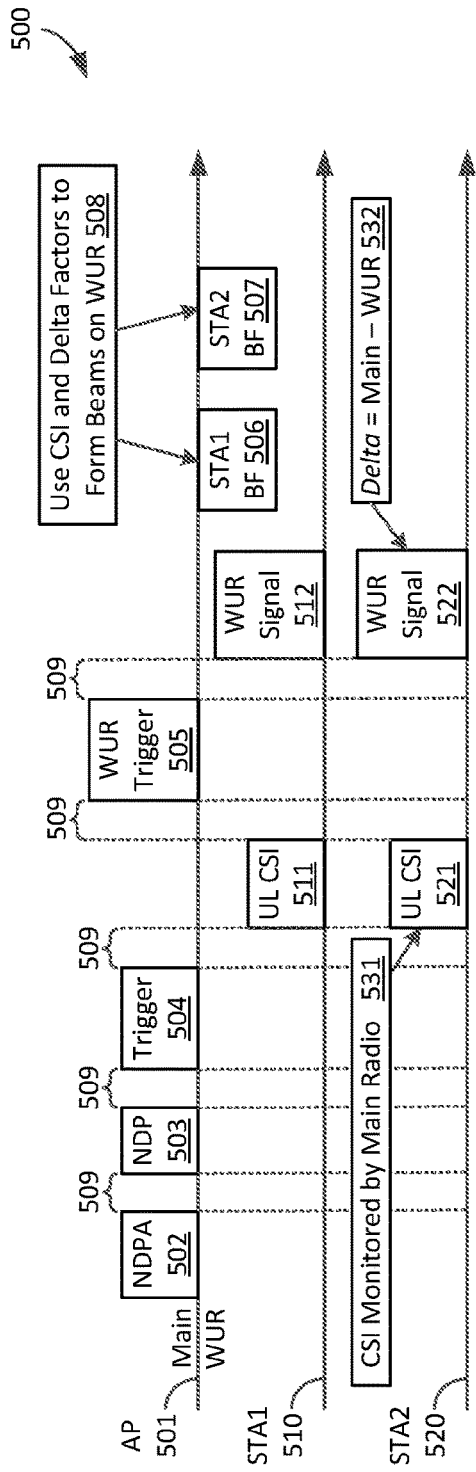
FIG. 5 illustrates an exemplary beamforming transmission procedure.

WUR negotiations may be driven by an AP in one or more beamforming transmission procedures. Alternatively, or in addition, WUR negotiations may be driven by a STA in one or more beamforming transmission procedures. FIG. 5 illustrates exemplary beamforming transmission procedure 500 for WUR negotiations that may be driven by an AP. Beamforming transmission procedures for WUR negotiations that may be driven by a STA are also contemplated herein.

Using a main radio, AP 501 may transmit a sounding frame or a set of sounding frames. AP 501 may transmit Null Data Packet (NDP) Announcement (NDPA) frame 502 to one or more STAs, such as STA1 510 and STA2 520. NDPA frame 502 may include a request that recipient STA(s) (e.g., STA1 510, STA2 520) report CSI and/or channel quality indication (CQI) information, for example, over an entire band and/or over one or more resource units (RUs).

AP 501 may, after an interframe spacing (IFS) duration xIFS 509 that may follow transmission of NDPA frame 502, transmit NDP frame 503 using a main radio. NDP frame 503 may include one or more sounding sequences. Note that terms such as "xIFS", where "x" may be any value, variable, or indicator, are used herein to denote various IFSs that may or may not be the same as any other one or more IFSs described herein.

AP 501 may attempt to reuse channel measurements in one or more future transmissions, for example, using a different radio. AP 501 may be configured to not apply spatial precoding on NDP training sequences.

AP 501 may be configured to apply a precoding scheme on one or more NDP training sequences. AP 501 may be configured to apply a same precoding scheme to one or more (e.g., future) WUR transmissions.

AP 501 may, after xIFS duration 509 that may follow transmission of NDP frame 503, transmit trigger frame 504 that may request one or more measurements, such as one or more channel state information measurements from one or both of STA1 510 and STA2 520. Any type of request for any one or more measurements and any combination of any one or measurements is contemplated herein.

STA1 510 and STA2 520 may transmit UL CSI 511 and 521, respectively, to AP 501, in response to trigger frame 504. UL CSI 511 and 521 may be transmitted by STA1 510 and STA2 520 after xIFS duration 509 that may follow transmission of trigger frame 504. Measurement information, such as UL CSI 521, may include information that may have been obtained or otherwise determined by monitoring a main radio 531. Any other measurements, and any combination thereof, are contemplated herein.

AP 501 may, after xIFS duration 509 that may follow receipt of UL CSI 511 and UL CSI 521, transmit WUR trigger frame 505 to one or both of STA1 510 and STA2 520. Alternatively, or in addition, transmission of WUR trigger frame 505 may be performed using a different transmit opportunity (TXOP) than that previously used by AP 501 to transmit, e.g., frames 502, 503, 504.

AP 501 may sense and/or acquire a channel that may be used to transmit WUR trigger frame 505. WUR trigger frame 505 may include a closed loop transmission indication that may indicate an intention of performing one or more closed loop transmissions. WUR trigger frame 505 may include an indication (e.g., an explicit indication) of a detailed closed loop transmission scheme. WUR trigger frame 505 may include a beamforming scheme indication. A beamforming scheme indication may instruct, or otherwise indicate, to one or more STAs (e.g., STA1 501, STA2 502) that such STAs may be required to transmit one or more delta factors to an AP (e.g., AP 501).

Following xIFS duration 509 after a reception of WUR trigger frame 505, STA1 510 and STA2 520 may respond by transmitting WUR signal frame 512 and WUR signal frame 522, respectively, to AP 501. WUR signal frames 512 and 522 may be transmitted using a single-user (SU) transmission or a multi-user (MU) transmission, or any combination thereof. One or more delta factors 532 may be included in WUR signal frames such as WUR signal frame 512 and/or WUR signal frame 522, for example, where a closed loop transmission indication may be set in a WUR trigger frame (e.g., WUR trigger frame 505).

Using a WUR channel, AP 501 may send beamforming (BF) transmissions 506, 507 to STA1 510 and STA2 520, respectively. AP 501 may store, obtain, or otherwise determine CSI (e.g., per sub-carrier, per x sub-carriers) that may have been measured on AP 501's main radio. AP 501 may store, obtain, or otherwise determine one or more receive delta factors (e.g., per receive antenna, per receive layer). AP 501 may store, obtain, or otherwise determine one or more transmit delta factors (e.g., per transmit antenna, per transmit layer). Such one or more transmit delta factors may be available or obtainable, for example, when AP 501 may use different RF chains to transmit main WLAN signals and/or WUR WLAN signals. AP 501 may use CSI and one or more delta factors 508 to generate BF transmissions STA1 BF 506 and/or STA2 BF 507.

AP 501 may store, obtain, or otherwise determine one or more WUR BF weights, for example, based on any information described herein.

AP 501 may apply one or more WUR BF weights in a time domain and/or a frequency domain. WUR BF weights in a time domain may differ from those in a frequency domain. AP 501 may indicate a time domain or a frequency domain to which one or more WUR BF weights may be applied in a WUR PHY header.

Concurrent WUR MU-MIMO transmissions may be performed, for example, when one or more beamforming weights may be obtained or otherwise determined. Such one or more beamforming weights may be obtained or otherwise determined for potential use in improving signal strength of transmissions and/or suppressing signal strength of interfering signals.

An AP may apply WUR BF weights in a time domain and/or in a frequency domain. An AP may have frequency domain CSI (e.g., per sub-carrier, per x sub-carriers) that may have been measured by a main radio. Such CSI may be referred to as $H_k$, where k may be a sub-carrier index. An AP may apply one or more delta factors (e.g., at a transmitter and/or a receiver) to a channel matrix H Such an AP may obtain or otherwise determine corrected CSI that may be referred to as $Hc_k$. An AP may obtain or otherwise determine covariance matrix COV over multiple sub-carriers. Equation 3 illustrates an exemplary mathematical equation that may be used to determine covariance matrix COV over multiple sub-carriers.

$$COV = E(Hc_k Hc^H_k) \qquad (3)$$

A correction may be applied to a COV matrix that may be calculated based on $H_k$. For example, equations 4 and 5 may be used to calculate a covariance matrix used for beamforming weight generation.

$$COV_{pre} = E(H_k H^H_k) \qquad (4)$$

$$COV = COV_{pre} + E(\text{delta delta}^H) \qquad (5)$$

One or more BF weights may be acquired, or otherwise determined, by applying a singular value decomposition (SVD) to a covariance matrix. The one or more sets of resulting BF weights may be applied in a frequency domain to one or more sub-carriers (e.g., to all sub-carriers). Applying the resulting one or more sets of resulting BF weights in a frequency domain to one or more sub-carriers (e.g., to all sub-carriers) may be equivalent, or substantially equivalent, to applying a single set of such BF weights in a time domain.

An AP may obtain, or otherwise determine, one or more BF weights based on an SVD that may be performed on one or more Hc matrices. Such one or more BF weights may be one or more of, or any combination of, per sub-carrier weights and per x sub-carrier weights (e.g., x may have a value greater than 1). Such one or more BF weights may be applied to a corresponding WUR signal in a frequency domain.

Figure 6:
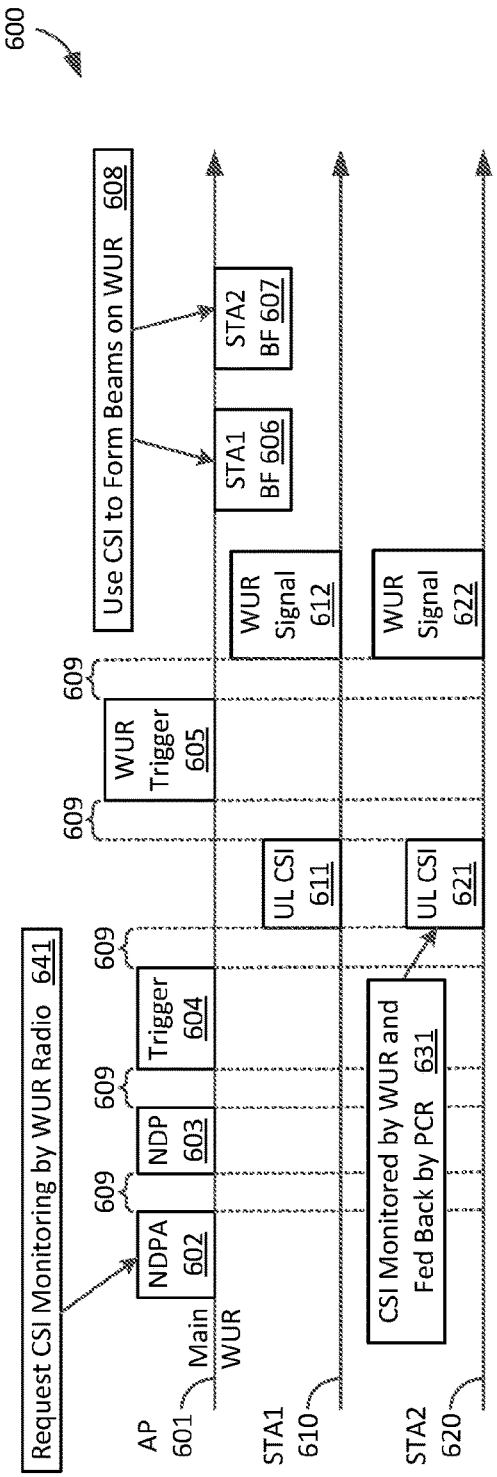
FIG. 6 illustrates another exemplary beamforming transmission procedure.

A WUR beamforming transmission procedure may not use delta factors. FIG. 6 illustrates exemplary beamforming transmission procedure 600 for WUR negotiations that may be driven by an AP and that may not use delta factors. Beamforming transmission procedures for WUR negotiations that may be driven by a STA and that may not use delta factors are also contemplated herein.

One or more of WUR STA1 610 and WUR STA2 620 may be capable of monitoring multiple WUR channels simultaneously. One or more of WUR STA1 610 and WUR STA2 620 may be assigned to perform one or more CSI measurements on an assigned WUR channel. Such one or more CSI measurements may be performed using a WUR (e.g., WUR STA1 610, WUR STA2 620) and without delta factors.

Using a main radio, AP 601 may transmit a sounding frame or a set of sounding frames. AP 601 may transmit NDPA frame 602 to one or more STAs, such as STA1 610 and STA2 620. NDPA frame 602 may include request 641 requesting that recipient STA(s) (e.g., STA1 610, STA2 620) monitor and report CSI and/or CQI information for a WUR radio, for example, over an entire band and/or over one or more RUs.

AP 601 may use an "other radio" field (may also be referred to as a "second radio" field) in a request frame to request that one or more CSI measurements be performed on another radio, e.g., a WUR radio. For example, AP 601 may indicate such a request in NDPA frame 602 and/or via a field (e.g., an "other radio" field) in NDPA frame 602 and/or any other frame. AP 601 may include such a field indicating a request that one or more CSI measurements be performed on a WUR radio in addition to normal NDPA fields.

One or both of STA1 610 and STA2 620 may be able to perform wideband reception over one or more WUR channels. AP 601 may instruct (e.g., via NDPA frame 602) one or both of STA1 610 and STA2 620 to report CSI on one or more of such WUR channels (e.g., on all such WUR channels).

One or both of STA1 610 and STA2 620 may not be able to perform wideband reception using a WUR radio and/or a WUR channel. AP 601 may indicate a WUR channel index and/or ID (e.g., via NDPA frame 602) to one or both of STA1 610 and STA2 620, requesting that the respective one or more of STA1 610 and STA2 620 monitor CSI on a WUR channel indicated by such a WUR channel index and/or ID.

On reception of a frame (e.g., NDPA frame 602) having an "other radio" field set, or a similar field set, one or both of STA1 610 and STA2 620 may use another radio, such as a WUR radio, to listen, monitor, and/or measure CSI on one or more WUR channels that may be indicated by such an "other radio" or similar field.

AP 601 may, after yIFS duration 609 that may follow transmission of NDPA frame 602, transmit NDP frame 603 using a main radio. NDP frame 603 may include one or more sounding sequences.

AP 601 may attempt to reuse channel measurements in one or more future transmissions, for example, using a different radio. AP 601 may be configured to not apply spatial precoding on NDP training sequences.

AP 601 may be configured to apply a precoding scheme to one or more NDP training sequences. AP 601 may be configured to apply a same precoding scheme on one or more (e.g., future) WUR transmissions.

One or both of STA1 610 and STA2 620 may know, obtain, or otherwise determine a training field location within NDP frame 603. One or both of STA1 610 and STA2 620 may measure a channel using a WUR based on a training field of NDP frame 603.

One or both of STA1 610 and STA2 620 may know, obtain, or otherwise determine a duration of NDP frame 603. One or both of STA1 610 and STA2 620 may switch back to a main radio after reception of NDP frame 603.

yIFS duration 609 may be the same, or substantially the same, as xIFS duration 509 described herein regarding FIG. 5. For example, an IFS may be a same IFS for both examples that may make use of one or more delta factors and examples that do not make use of a delta factor.

yIFS duration 609 may be longer than xIFS duration 509 described herein regarding FIG. 5. For example, an IFS used in an example that may make use of one or more delta factors may be shorter than an IFS used in an example that does not make use of a delta factor. A relatively longer yIFS duration may provide STAs with more time to switch between radio sets (e.g., between two radio sets) in an example that does not make use of a delta factor.

AP 601 may, after yIFS duration 609 that may follow transmission of NDP frame 603, transmit trigger frame 604 that may request one or more measurements, such as one or more channel state information measurements, from one or both of STA1 610 and STA2 620. Any type of request for any one or more measurements and any combination of any one or measurements is contemplated herein.

STA1 610 and STA2 620 may transmit UL CSI 611 and 621, respectively, to AP 601, in response to trigger frame 604. UL CSI 611 and 621 may be transmitted by STA1 610 and STA2 620 after yIFS duration 609 that may follow transmission of trigger frame 604. Measurement information, such as UL CSI 621, may include information that may have been obtained, or otherwise determined, by monitoring a WUR radio 631. Any other measurements and any combination thereof, are contemplated herein.

In one or both of exemplary UL CSI 611 and 621 frames, STA1 610 and/or STA2 620, respectively, may use an "other radio" field (or a "second radio" field or any similar field) to indicate that a CSI may be measured over another radio, such as a WUR radio. Requested CSI may be associated with measurement of one WUR channel, multiple WUR channels, or all WUR channels.

CSI may include any one or more of, and/or any combination of, time domain CSI determined for a narrow band WUR channel, time domain CSI determined for a set of BF weights per one or more WUR channels, frequency domain CSI determined for a narrow band WUR channel, frequency domain CSI determined for a set of BF weights per one or more WU, and any other type of CSI.

AP 601 may, after xIFS duration 609 that may follow receipt of UL CSI 611 and UL CSI 621, transmit WUR trigger frame 605 to one or both of STA1 610 and STA2 620. Alternatively, or in addition, transmission of WUR trigger frame 605 may be performed using a different TXOP than that previously used by AP 601 to transmit, e.g., frames 602, 603, 604.

AP 601 may sense and/or acquire a channel that may be used to transmit WUR trigger frame 605. WUR trigger frame 605 may include a closed loop transmission indication that may indicate an intention of performing one or more closed loop transmissions. WUR trigger frame 605 may include an indication (e.g., an explicit indication) of a detailed closed loop transmission scheme. WUR trigger frame 605 may include a beamforming scheme indication.

Following yIFS duration 609 after a reception of WUR trigger frame 605, STA1 610 and STA2 620 may respond by transmitting WUR signal frame 612 and WUR signal frame 622, respectively, to AP 601 using a PCR or a main radio. WUR signal frames 612 and 622 may be transmitted using an SU transmission or an MU transmission, or any combination thereof.

Using a WUR channel, AP 601 may send BF transmissions 606, 607 to STA1 610 and STA2 620, respectively. AP 601 may store, obtain, or otherwise determine CSI (e.g., per sub-carrier, per x sub-carriers) that may have been measured in a time domain and/or a frequency domain on AP 601's WUR radio. AP 601 may store, obtain, or otherwise determine one or more WUR BF weights, for example, based on any information described herein. AP 601 may use CSI 608 to generate BF transmissions STA1 BF 606 and/or STA2 BF 607.

AP 601 may apply one or more WUR BF weights in a time domain and/or a frequency domain. WUR BF weights in a time domain may differ from those in a frequency domain. AP 601 may indicate a time domain or a frequency domain to which one or more WUR BF weights may be applied in a WUR PHY header.

Figure 7:
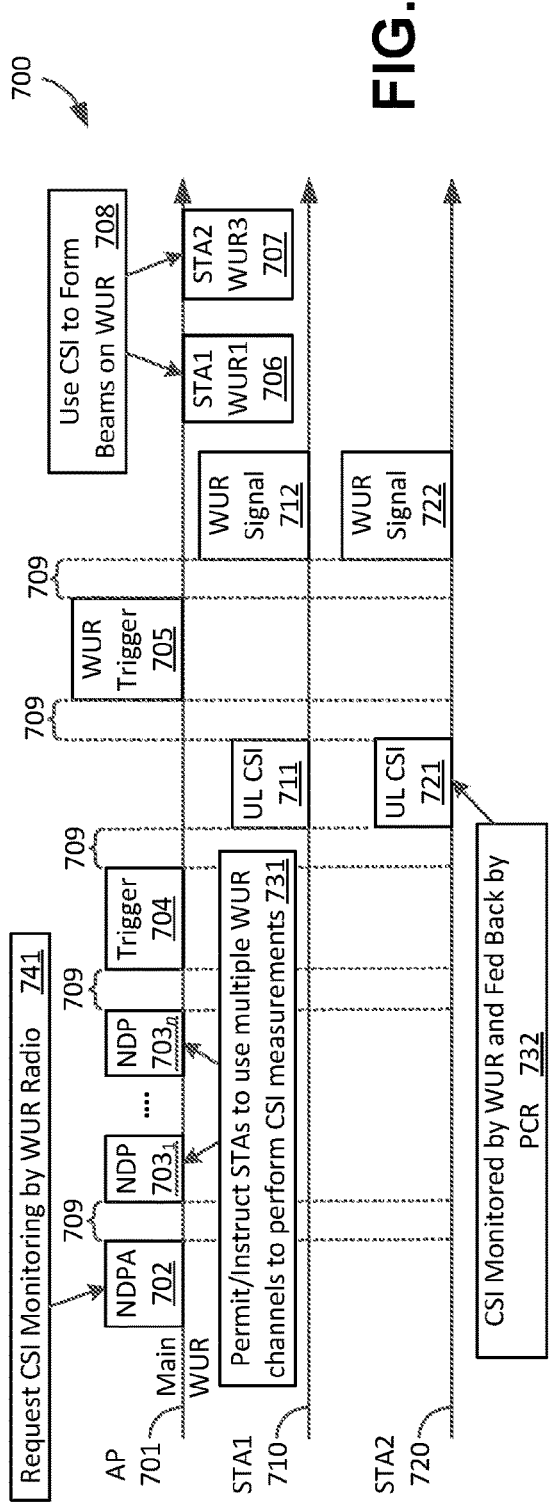
FIG. 7 illustrates another exemplary beamforming transmission procedure.

As noted, a WUR beamforming transmission procedure may not use delta factors. FIG. 7 illustrates exemplary beamforming transmission procedure 700 for WUR negotiations that may be driven by an AP and that may not use delta factors. Beamforming transmission procedures for WUR negotiations that may be driven by a STA and that may not use delta factors are also contemplated herein.

Using a main radio, AP 701 may transmit a sounding frame or a set of sounding frames. AP 701 may transmit NDPA frame 702 to one or more STAs, such as STA1 710 and STA2 720. STA1 710 and/or STA2 720 may not be able and/or configured to monitor multiple WUR channels simultaneously. NDPA frame 702 may include request 741 requesting that recipient STA(s) (e.g., STA1 710, STA2 720) monitor and report CSI and/or CQI information for one or more WUR channels using at least one WUR radio, for example, over an entire band and/or over one or more RUs.

AP 701 may indicate, for example, in NDPA frame 702, that multiple NDP frames $703_1 \ldots 703_n$ may be transmitted that may instruct and/or allow one or more STAs (e.g., STA1 710, STA2 720) to switch to and monitor each of multiple WUR channels sequentially (as opposed to simultaneously). A number of such NDP frames may be, e.g., explicitly, signaled in a frame, such as NDPA frame 702. Alternatively, or in addition, a number of such NDP frames may be implicitly indicated, for example, where a number of NDP frames may be the same as a number of WUR channels associated with a "normal" WLAN bandwidth. Any one or more of NDP frames $703_1 \ldots 703_n$ may indicate to one or both of STA1 710 and STA2 720 that such STAs may be instructed and/or allowed to use multiple WUR channels to perform one or more CSI measurements.

One or more of STA1 710 and STA2 720, in response to either an explicit or implicit indication of a number of NDP frames, may switch to a first WUR channel (e.g., WUR channel 1), for example, after zIFS duration 709 following receipt of NDPA frame 702. zIFS duration 709 may be equal to, or greater than, an amount of time that may be used for radio set switching. zIFS duration 709 may be less than, equal to, or greater than either of xIFS duration 509 and yIFS 609 described herein.

STA1 710 and/or STA2 720 may switch to a WUR radio and monitor one or more WUR channels (e.g., all applicable WUR channels) during one or more NDP frame transmission periods. STA1 710 and/or STA2 720 may subsequently switch back to a main radio after switching to the WUR radio and monitoring one or more WUR channels.

AP 701 may perform beamforming using CQI measured, e.g., directly, by one or both of STA1 710 and STA2 720 on one or more WUR channels. One or both of STA1 710 and STA2 720 may or may not be configured to receive transmissions via multiple WUR channels.

AP 701 may transmit trigger frame 704, for example, after zIFS duration 709 that may follow transmission of NDP frame $703_g$. NDP frame 703, may be a final NDP frame of the set of NDP frames $703_1 \ldots 703_n$. Trigger frame 704 may request one or more measurements, such as one or more channel state information measurements, from one or both of STA1 710 and STA2 720. Any type of request for any one or more measurements and any combination of any one or measurements is contemplated herein.

STA1 710 and STA2 720 may transmit UL CSI 711 and 721, respectively, to AP 701, in response to trigger frame 704. UL CSI 711 and 721 may be transmitted by STA1 710 and STA2 720 after zIFS duration 709 that may follow transmission of trigger frame 704.

Measurement information, such as UL CSI 721, may include information 732, such as CSI (e.g., that may have been obtained, or otherwise determined, by the WUR monitoring one or more WUR channels). The CSI may be monitored by the WUR and fed back by the PCR. For example, one or more of NDP frames $703_1 \ldots 703_n$ may have permitted and/or instructed STA2 720 to feed back CSI monitored by a WUR at 732. Any other measurements and any combination thereof, are contemplated herein.

CSI may include any one or more of, and/or any combination of, time domain CSI determined for a narrow band WUR channel, time domain CSI determined for a set of BF weights per one or more WUR channels, frequency domain CSI determined for a narrow band WUR channel, frequency domain CSI determined for a set of BF weights per one or more WU, and any other type of CSI.

AP 701 may, after zIFS duration 709 that may follow receipt of UL CSI 711 and UL CSI 721, transmit WUR trigger frame 705 to one or both of STA1 710 and STA2 720. Alternatively, or in addition, transmission of WUR trigger frame 705 may be performed using a different TXOP than that previously used by AP 701 to transmit, e.g., frames 702, 703, 704.

Following zIFS duration 709 after a reception of WUR trigger frame 705, STA1 710 and STA2 720 may respond by transmitting WUR signal frame 712 and WUR signal frame 722, respectively, to AP 701. WUR signal frames 712 and 722 may be transmitted using an SU transmission or an MU transmission, or any combination thereof.

Using a WUR channel, AP 701 may send STA1 WUR1 transmission 706 and STA2 WUR3 transmission 706 to STA1 710 and STA2 720, respectively, instructing STA1 710 to use WUR1 and STA2 720 to use WUR3, respectively. AP 701 may store, obtain, or otherwise determine CSI (e.g., per sub-carrier, per x sub-carriers) that may have been measured in a time domain and/or a frequency domain on AP 701's WUR radio. AP 701 may use 708 CSI to generate STA1 WUR1 transmission 706 and/or STA2 WUR3 transmission 707.

WUR channel estimation may be performed over a primary radio. An AP may learn (e.g., acquire, determine, and/or receive information) a wireless channel associated with a WUR radio. Such an AP may send a WUR channel request packet to a STA (e.g., a selected STA, a particular STA) using a primary control channel that may be associated with the wireless channel associated with the WUR radio. Such a WUR channel request packet may include one or more parameters that may be related to a WUR channel. For example, such parameters may include one or more of a number of taps, WUR configuration information (e.g., one or more WUR scanning locations), a number of training packets for a subsequent transmission, etc.

A STA may adjust its device configuration to allow the STA to receive signals (e.g., from the AP) over a WUR RF channel. Such a STA may send an ACK packet to the AP. The AP may send a training packet over the WUR channel to the STA. The STA may estimate the channel, which may be the WUR channel. The STA may send an ACK packet to the AP to indicate that the STA may be ready for a next training packet. The STA may send a feedback packet to the AP. Such a feedback packet may include information related the WUR channel, such as channel impulse response, one or more channel frequency coefficients on a WUR band, etc.

Figure 8:
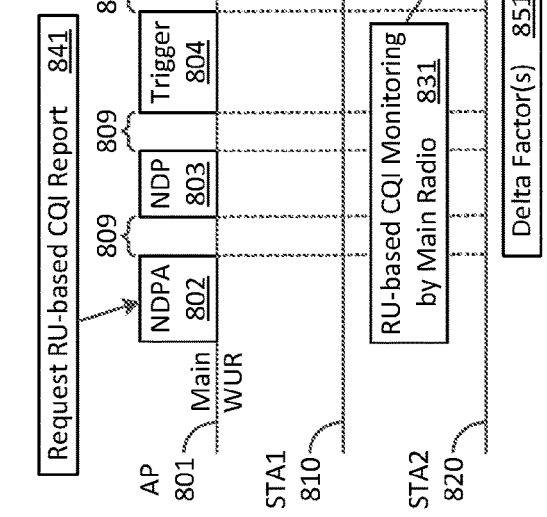
FIG. 8 illustrates an exemplary channel selection procedure.

One or more channel selection procedures may select one or more narrow band WUR channels from WUR channels that may be available to a STA. FIG. 8 illustrates exemplary channel selection procedure 800. In procedure 800, any one or more of NDPA frame 802, NDP frame 803, trigger frame 804, UL CSI frame 811, and UL CSI frame 821 may acquire, receive, or otherwise determine, one or more CQIs for one or more WUR channels. WUR numerology may differ from numerology that may be used in other WLANs. AP 801 may request an RU-based CQI report at 841. STA2 820 may respond by providing report 831 that may include results of RU-based CQI monitoring by a main radio, e.g., via UL CSI frame 821. An RU-based CQI report on a main radio, such as report 831, may be used to determine (e.g., calculate) WUR channel quality, e.g., by AP 801.

A STA may include delta factors in an UL CSI report. For example, STA2 802 may include delta factors 851 in UL CSI frame 821. AP 801 may, for example in WUR trigger frame 805, announce channel WUR assignment 861 for one or more STAs (e.g., for each STA associated with AP 801). Channel assignment 861 may be determined based on one or more, e.g., estimated, WUR CQI reports and/or one or more delta factors, e.g., delta factors 851. A CQI report may include SNR, SINR, RSSI, etc. An estimated WUR CQI may be a function of one or more factors that may include a CQI report on a main radio, one or more delta factors reported by one or more STAs to an AP (e.g., one or more delta factors 851 reported by STA2 820 via UL CSI frame 821 to AP 801), and/or transmit delta factors at an AP (e.g., AP 801).

Following aIFS duration 809 after a reception of WUR trigger frame 805, STA1 810 and STA2 820 may respond by transmitting WUR signal frame 812 and WUR signal frame 822, respectively, to AP 801. WUR signal frames 812 and 822 may be transmitted using an SU transmission or an MU transmission, or any combination thereof.

One or more selected WUR channels may be assigned to one or more STAs for subsequent transmissions. For example, AP 801 may assign, at 808, channel WUR1 to STA1 810 at 806 and/or channel WUR3 to STA2 820 at 807.

Figure 9:
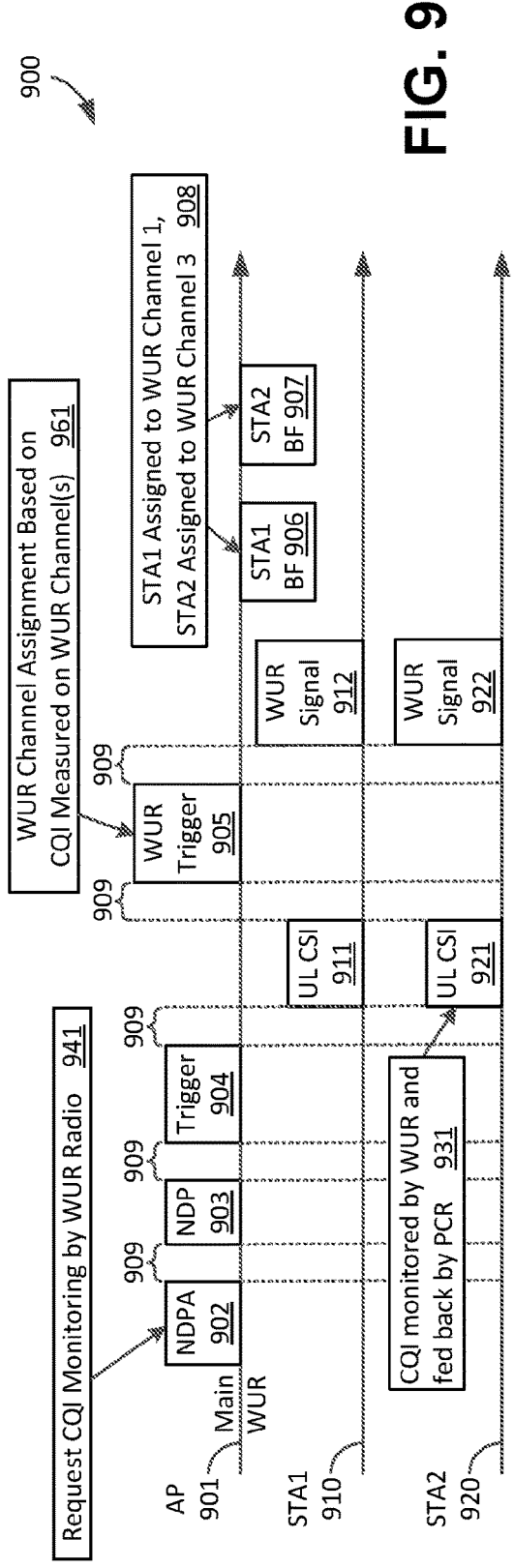
FIG. 9 illustrates another exemplary channel selection procedure.

FIG. 9 illustrates exemplary channel selection procedure 900 that may not use delta factors. In procedure 900, STA1 910 and/or STA2 920 may acquire, receive, or otherwise determine one or more CQIs for one or more WUR channels. One or more requests for monitoring and determining such CQIs for one or more WUR channels may be transmitted, e.g., by AP 901, via any one or more of NDPA frame 902, NDP frame 903, and trigger frame 904. A number of NDP frames may be, e.g., explicitly, signaled in a frame, such as NDPA frame 902. Alternatively, or in addition, a number of NDP frames may be implicitly indicated, for example, where a number of NDP frames may be the same as a number of WUR channels associated with a "normal" WLAN bandwidth.

In response to receiving NDPA frame 902 that may include request 941 for monitoring and determining CQIs for one or more WUR channels, one or more recipients of NDPA frame 902 (e.g., recipients such as STA1 910 and STA2 920) may switch to one or more WUR channels, e.g., after bIFS duration 909 following transmission of NDPA frame 902. A value of bIFS duration 909 that is equal to or greater than a time for radio set switching may be selected.

WUR STA 910 and/or WUR STA 920 may not be capable of monitoring and/or receiving on multiple WUR channels simultaneously. STA1 910 and/or STA2 920 may monitor one or more WUR channels (e.g., all WUR channels) sequentially (as opposed to simultaneously) during a transmission period of NDP frame 903. One or more responses to a request, such as request 941, may be transmitted by one more recipient STAs (e.g., STA1 910, STA2 920) via any one or more of UL CSI frames. For example, responsive to request 941 that may be included in NDPA frame 902, STA2

920 may feed back CQI at 931, via UL CSI frame 921. In examples, at 931 the CQI may be monitored by the WUR and fed back by the PCR. Note that STA1 910 and/or any STA in communication with AP 901 may also, or instead, receive a request for CQI monitoring and perform WUR monitoring and/or generation of a CQI report for a WUR channel that may be transmitted to one or more APs.

STA1 910 and/or STA2 920 may switch back to a main radio, e.g., following the monitoring of one or more WUR channels. AP 901 may perform channel selection and/or assignment 961 based, at least in part, on CQI measured on one or more WUR channels (e.g., directly) at 961. Channel selection and/or assignment 961 may be transmitted to STA1 901 and/or STA2 902 in WUR trigger frame 905.

Following bIFS duration 909 after a reception of WUR trigger frame 905, STA1 910 and STA2 920 may respond by transmitting WUR signal frame 912 and WUR signal frame 922, respectively, to AP 901, WUR signal frames 912 and 922 may be transmitted using an SU transmission or an MU transmission, or any combination thereof.

Figure 10:
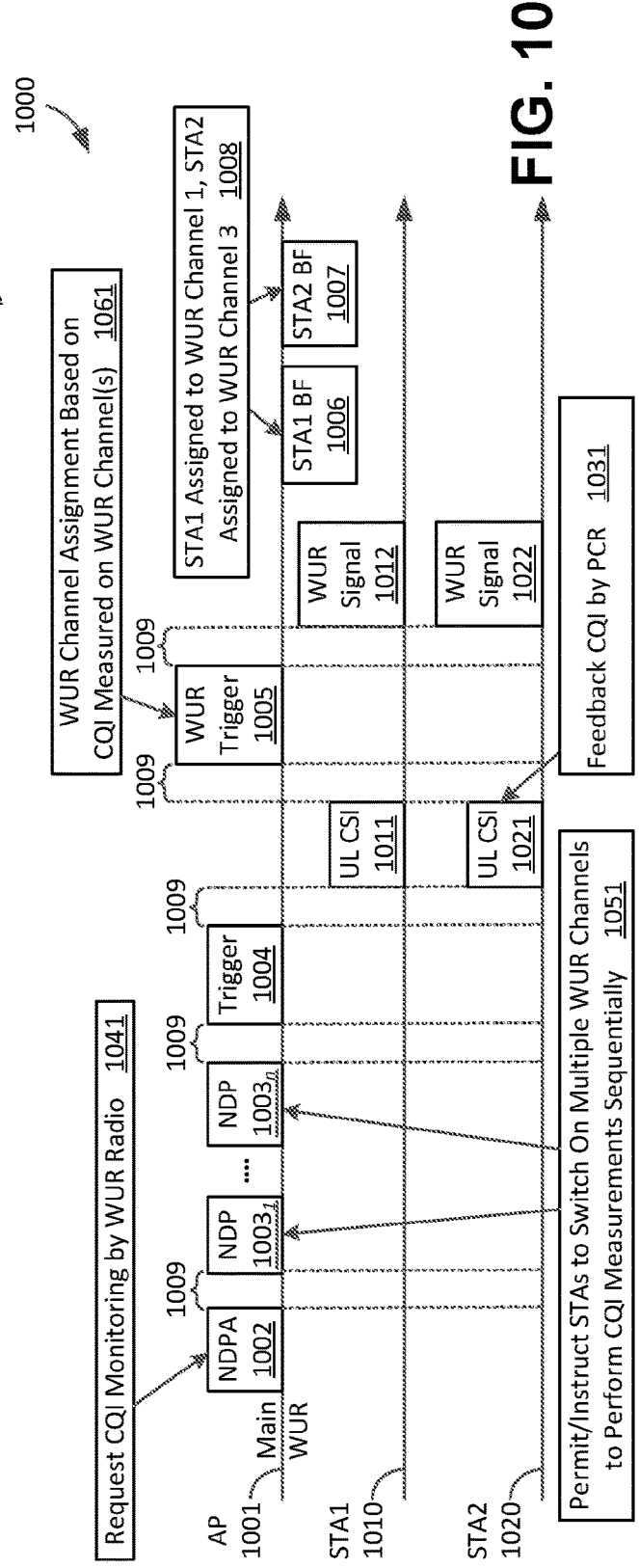
FIG. 10 is a system diagram of an example radio access network (RAN) and an example core network (CN) that may be used within the communications system illustrated in FIG. 1A.

FIG. 10 illustrates exemplary channel selection procedure 1000 that may not use delta factors. In procedure 1000, STA1 1010 and/or STA2 1020 may acquire, receive, or otherwise determine one or more CQIs for one or more WUR channels. STA1 1010 and/or STA2 1020 may not be able and/or configured to monitor multiple WUR channels simultaneously. One or more requests for monitoring and determining CQIs for one or more WUR channels may be transmitted, e.g., by AP 1001, via any one or more of NDPA frame 1002, NDP frames $1003_x$, and trigger frame 1004.

AP 1001 may indicate, for example in NDPA frame 1002, that multiple NDP frames $1003_1 \ldots 1003_n$ may be transmitted that may instruct and/or allow one or more STAs (e.g., STA1 1010, STA2 1020) to switch to and monitor each of multiple WUR channels sequentially (as opposed to simultaneously). A number of such NDP frames may be, e.g., explicitly, signaled in a frame, such as NDPA frame 1002. Alternatively, or in addition, a number of such NDP frames may be implicitly indicated, for example, where a number of NDP frames may be the same as a number of WUR channels associated with a "normal" WLAN bandwidth. Any one or more of NDP frames $1003_1 \ldots 1003_n$ may indicate 1051 to one or both of STA1 1010 and STA2 1020 that one or both of these STAs may be instructed and/or allowed to use multiple WUR channels to perform one or more CQI measurements. Such measurements may be performed by one or both of STA1 1010 and STA2 1020 sequentially In response to receiving NDPA frame 1002 that may include request 1041 for monitoring and determining CQIs for one or more WUR channels, one or more recipients of NDPA frame 1002 (e.g., recipients such as STA1 1010 and STA2 1020) may switch to one or more WUR channels, e.g., after cIFS duration 1009 following transmission of NDPA frame 1002. A value of cIFS duration 1009 that is equal to or greater than a time for radio set switching may be selected.

As noted, WUR STA 1010 and/or WUR STA 1020 may not be capable of monitoring and/or receiving on multiple WUR channels simultaneously. STA1 1010 and/or STA2 1020 may monitor one or more WUR channels (e.g., all WUR channels) sequentially (as opposed to simultaneously) during a transmission period of NDP frame $1003_x$. One or more responses to a request, such as request 1041, may be transmitted by one or more recipient STAs (e.g., STA1 1010, STA2 1020) via any one or more UL CSI frames. For example, responsive to request 1041 that may be included in NDPA frame 1002, STA2 1020 may feed back CQI at 1031 via UL CSI frame 1021. In examples, at 1031 CQI may be fed back by the PCR. Note that STA1 1010 and/or any STA in communication with AP 1001 may also, or instead, receive a request for CQI monitoring and may perform WUR monitoring and/or generation of a CQI report that may be transmitted to one or more STAs.

STA1 1010 and/or STA2 1020 may switch back to a main radio, e.g., following the monitoring of one or more WUR channels. AP 1001 may perform channel selection and/or assignment 1061 based, at least in part, on CQI measured on one or more WUR channels (e.g., directly) at 1061. Channel selection and/or assignment 1061 may be transmitted to STA1 1001 and/or STA2 1002 in WUR trigger frame 1005.

Following cIFS duration 1009 after a reception of WUR trigger frame 1005, STA1 1010 and STA2 1020 may respond by transmitting WUR signal frame 1012 and WUR signal frame 1022, respectively, to AP 1001. WUR signal frames 1012 and 1022 may be transmitted using an SU transmission, an MU transmission, or any combination thereof.

A transmission rate and/or MCS may be selected, or otherwise determined, for a WUR, e.g., from among multiple transmission rates and/or MCSs available in a relevant system. FIG. 11 illustrates exemplary WUR rate selection procedure 1100. Any combination of NDPA frame 1102, NDP frame 1103, trigger frame 1104, UL CSI feedback frame 1111, and UL CSI feedback frame 1121 may be used to acquire, or otherwise determine, CQI for one or more channels associated with a WUR. WUR numerology may differ from numerology that may be used in other WLANs. AP 1101 may request RU-based CQI report 1141 for a main radio that may be used to determine (e.g., calculate) WUR channel quality. AP 1101 may request RU-based CQI report 1141 via NDPA frame 1102. STA2 1120 may respond by providing CQI results, e.g., via UL CSI frame 1121, that may include results from RU-based CQI monitoring by a PCR at 1131.

STA2 1120 may include one or more delta factors 1151 in UL CSI frame 1121. AP 1101 may, for example in WUR trigger frame 1105, announce WUR rate assignment 1161 for one or more STAs (e.g., for each STA associated with AP 1101). Rate assignment 1161 may be determined based on one or more of, e.g., estimated, WUR CQI reports, e.g., CQI results 1131, and/or one or more delta factors, e.g., delta factors 1151. A CQI report may include SNR, SINR, RSSI, etc. An estimated WUR CQI may be a function of one or more factors that may include a CQI report on a main radio, one or more delta factors reported by one or more STAs to an AP (e.g., one or more delta factors 1151 reported by STA2 1120 via UL CSI frame 1121 to AP 1101), and/or transmit delta factors at an AP (e.g., AP 1101).

Following dIFS duration 1109 after a reception of WUR trigger frame 1105, STA1 1110 and STA2 1120 may respond by transmitting WUR signal frame 1112 and WUR signal frame 1122, respectively, to AP 1101. WUR signal frames 1112 and 1122 may be transmitted using an SU transmission or an MU transmission, or any combination thereof.

One or more selected WUR rates may be assigned to one or more STAs for subsequent transmissions. For example, AP 1101 may assign, at 1108, WUR rate 1 to STA1 1110 via STA1 rate 1 frame 1106. AP 1101 may assign, at 1108, WUR rate 2 to STA2 1120 via STA2 rate 2 frame 1107.

A transmission rate and/or MCS may be selected, or otherwise determined, without the use of delta factors, for a WUR, e.g., from among multiple transmission rates and/or MCSs available in a relevant system. FIG. 12 illustrates exemplary WUR rate selection procedure 1200 that may not use delta factors. Any combination of NDPA frame 1202, NDP frame 1203, trigger frame 1204, UL CSI feedback frame 1211, and UL CSI feedback frame 1221 may acquire, or otherwise determine, CQI for one or more WUR channels. WUR numerology may differ from numerology that may be used in other WLANs. AP 1201 may request an RU-based CQI report at 1241 for a WUR radio that may be used to determine (e.g., calculate) WUR channel quality. AP 1201 may request 1241 RU-based CQI report via NDPA frame 1202. STA2 1220 may respond by providing CQI results, e.g., via UL CSI frame 1221, that may include results from RU-based CQI monitoring by a WUR radio at 1231.

In response to receiving NDPA frame 1202 that may include request 1241 for monitoring and determining CQIs for one or more WUR channels, one or more recipients of NDPA frame 1202 (e.g., STA1 1210, STA2 1220) may switch to one or more WUR channels, e.g., after eIFS duration 1209 following transmission of NDPA frame 1202. A value of eIFS duration 1209 that is equal to or greater than a time for radio set switching may be selected.

STA1 1210 and/or STA2 1220 may monitor one or more WUR channels (e.g., all WUR channels) simultaneously. Alternatively, STA1 1010 and/or STA2 1020 may monitor one or more WUR channels (e.g., all WUR channels) sequentially (as opposed to simultaneously) during a transmission period of NDP frame 1203. One or more responses to one or more requests such as request 1241 may be transmitted via any one or more of UL CSI frame 1211 and UL CSI frame 1221. For example, responsive to such a request, STA2 1220 may feed back CQI (e.g., determined at 1231) via UL CSI frame 1221. Note that STA1 1210 and/or any STA in communication with AP 1201 may also, or instead, receive a request for CQI monitoring and perform WUR monitoring and generation of a CQI report.

STA1 1210 and/or STA2 1220 may switch back to a main radio, e.g., following the monitoring of one or more WUR channels. AP 1201 may perform rate selection and/or assignment 1261 based, at least in part, on CQI measured on one or more WUR channels (e.g., directly) at 1261. Rate selection and/or assignment 1261 may be transmitted to STA1 1201 and/or STA2 1202 in WUR trigger frame 1205.

AP 1201 may, for example in WUR trigger frame 1205, announce WUR rate assignment 1261 for one or more STAs (e.g., for each STA associated with AP 1201). Rate assignment 1261 may be determined based on at least, e.g., estimated, WUR CQI results. A CQI report may include SNR, SINR, RSSI, etc. An estimated WUR CQI may be a function of one or more factors that may include CQI results for a main radio.

Following eIFS duration 1209 after a reception of WUR trigger frame 1205, STA1 1210 and STA2 1220 may respond by transmitting WUR signal frame 1212 and WUR signal frame 1222, respectively, to AP 1201. WUR signal frames 1212 and 1222 may be transmitted using an SU transmission or an MU transmission, or any combination thereof.

One or more selected WUR rates may be assigned to one or more STAs (e.g., STA1 1210, STA2 1220) for subsequent transmissions. For example, AP 1201 may assign, at 1208, WUR rate 1 to STA1 1210 via STA1 rate 1 frame 1206. AP 1201 may assign, at 1208, WUR rate 2 to STA2 1210 via STA2 rate 2 frame 1207.

Figure 13:
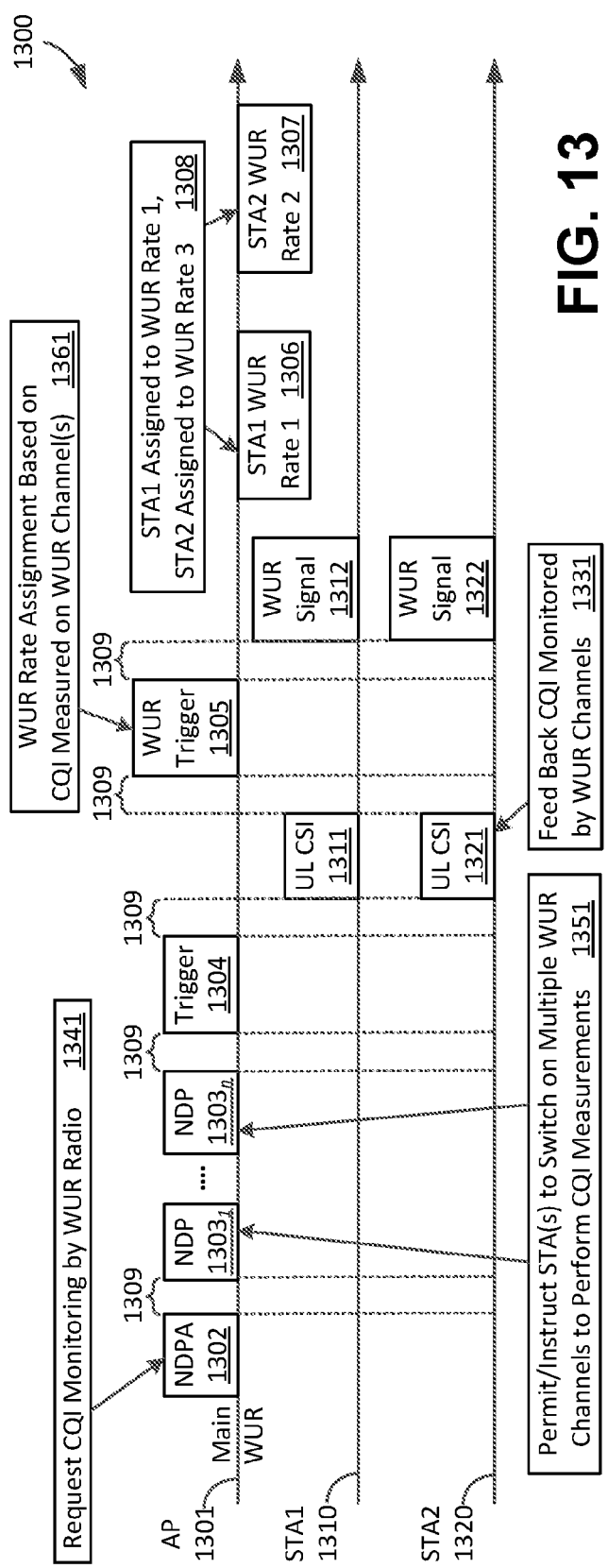
FIG. 13 illustrates another exemplary rate selection procedure.

FIG. 13 illustrates exemplary WUR rate selection procedure 1300 that may not use delta factors. In procedure 1300, STA1 1310 and/or STA2 1320 may acquire, receive, or otherwise determine one or more CQIs for one or more WUR channels. STA1 1310 and/or STA2 1320 may not be able and/or configured to monitor multiple WUR channels simultaneously. One or more requests for monitoring, determining, and/or measuring one or more CQIs for one or more WUR channels using a WUR radio may be transmitted, e.g., by AP 1301, via any one or more of NDPA frame 1302, NDP frames 1303$_x$, and trigger frame 1304.

AP 1301 may indicate, for example in NDPA frame 1302, that multiple NDP frames 1303$_1$ ... 1303$_n$ may be transmitted that may instruct and/or allow one or more STAs (e.g., STA1 1310, STA2 1320) to switch to and monitor each of multiple WUR channels sequentially (as opposed to simultaneously). A number of such NDP frames 1303$_1$ ... 1303$_n$ may be, e.g., explicitly, signaled in a frame, such as NDPA frame 1302. Alternatively, or in addition, a number of such NDP frames 1303$_1$ ... 1303$_n$ may be implicitly indicated, for example, where a number of NDP frames may be the same as a number of WUR channels associated with a "normal" WLAN bandwidth. Any one or more of NDP frames 1303$_1$ ... 1303$_n$ may indicate 1351, e.g., to AP 1301 via NDP frames 1303$_1$ ... 1303$_n$, that one or both of STA1 1310 and STA2 1320 may be instructed and/or allowed to use multiple WUR channels to perform one or more CQI measurements. STA1 1310 and/or STA2 1320 may monitor and/or measure one or more WUR channels (e.g., all WUR channels) sequentially (as opposed to simultaneously) during a transmission period of one or more of NDP frames 1303$_x$.

In response to receiving NDPA frame 1302 that may include request 1341 for monitoring and determining CQIs for one or more WUR channels, one or more recipients of NDPA frame 1302 (e.g., recipients such as STA1 1310 and STA2 1320) may switch to one or more WUR channels, e.g., after fIFS duration 1309 following transmission of NDPA frame 1302. A value of fIFS duration 1309 that is equal to or greater than a time for radio set switching may be selected.

One or more responses to a request, such as request 1341, may be transmitted by one or more recipient STAs (e.g., STA1 1310, STA2 1320) via any one or more UL CSI frames. For example, responsive to request 1341 that may be included in NDPA frame 1302, STA2 1320 may feed back, via UL CSI frame 1321, CQI obtained by monitoring one or more WUR channels at 1331. Note that STA1 1310 and/or any STA in communication with AP 1301 may also, or instead, receive a request for CQI monitoring and/or may perform WUR channel monitoring and/or generation of a CQI report for a WUR channel that may be transmitted to one or more APs.

STA1 1310 and/or STA2 1320 may switch back to a main radio, e.g., following the monitoring of one or more WUR channels. AP 1301 (e.g., subsequent to the switch back to a main radio) may perform rate determination, selection, and/or assignment at 1361 based, at least in part, on CQI measured on one or more WUR channels (e.g., directly). Rate determination, selection, and/or assignment at 1361 may be transmitted to STA1 1310 and/or STA2 1320 via WUR trigger frame 1305.

Following fIFS duration 1309 after reception of WUR trigger frame 1305, STA1 1310 and STA2 1320 may respond by transmitting WUR signal frame 1312 and WUR signal frame 1322, respectively, to AP 1301. Either or both of WUR signal frames 1312 and 1322 may be transmitted using an SU transmission, an MU transmission, or any combination thereof.

One or more selected, obtained, or otherwise determined WUR rates may be assigned (e.g., by AP 1301) to one or more STAs (e.g., STA1 1310, STA2 1320) for subsequent transmissions. For example, AP 1301 may assign, at 1308, WUR rate 1 to STA1 1310 via STA1 WUR rate 1 frame 1306. AP 1301 may assign, at 1308, WUR rate 2 to STA2 1320 via STA2 WUR rate 2 frame 1307.

Note that, while some aspects set forth herein describe the use of NDPA, NDP, trigger, WUR trigger, and/or other CSI feedback frame exchanges over a main radio and/or a WUR radio to perform one or more disclosed functions (e.g., channel sounding), any other schemes, exchanges, and procedures that may be consistent with the instant disclosure are contemplated.

Figure 14:
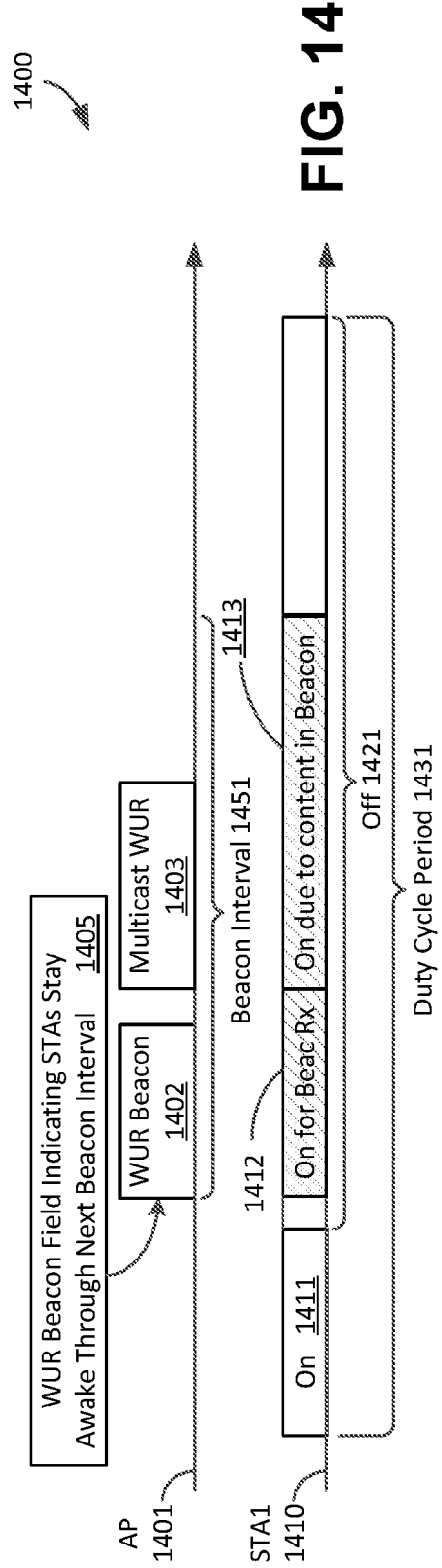
FIG. 14 illustrates an exemplary wake-up procedure.

FIG. 14 illustrates exemplary wake-up procedure 1400. STA1 1410 may initially be in "on" period 1411 of duty cycle period 1431. STA1 1410 may enter "off" period 1421, for example, upon arrival of "off" period 1421 of the applicable duty cycle. While in "off" period 1421, the STA may switch to "on" to monitor for WUR beacon transmission 1412. While in "off" period 1421, the STA may switch to "on" at 1413 due to content in the received WUR beacon.

AP 1401 may transmit WUR beacon 1402 during beacon interval 1451. WUR beacon field 1405 of WUR beacon 1402 may indicate that all STAs receiving WUR beacon 1402 are to stay "up" (e.g., "awake") during next beacon interval 1451. Multicast/broadcast WUR frame 1403 may be transmitted during beacon interval 1451.

STA1 1410 may acquire, obtain, or otherwise determine a configuration of WUR beacon interval 1451 and/or a configuration of a WUR duty cycle via, e.g., a WUR action frame that may be received from an AP, such as AP 1401. A WUR action frame may be transmitted using a primary connectivity radio (PCR). STA1 1410 may switch to WUR based on a configuration, e.g., received via a WUR action frame.

STA1 1410 may monitor WUR beacons when STA1 1410 may be in an "off" period of a duty cycle. STA1 1410 may detect and/or receive WUR beacon 1402. WUR beacon 1402 may include an indication and/or instruction, e.g., in field 1405, that one or more WUR STAs (e.g., all WUR STAs), including WUR STA1 1410, are to stay "awake" for the duration of WUR beacon interval 1451 and/or for a period of time after transmission and/or receipt of WUR beacon frame 1402.

WUR beacon interval 1451 and/or a period of time after transmission and/or receipt of WUR beacon frame 1402 may be predefined and/or preconfigured. A time period of WUR beacon interval 1451 and/or a period of time after transmission and/or receipt of WUR beacon frame 1402 may instead, or in addition, be determined dynamically, e.g., as needed, using any criteria that may be applicable. A time period of WRU beacon interval 1451 and/or a period of time after transmission and/or receipt of WUR beacon frame 1402 may be indicated in WUR beacon frame 1402. A time period of a WRU beacon interval (e.g., beacon interval 1451) and/or a period of time after transmission and/or receipt of a WUR beacon frame (e.g., WUR beacon frame 1452) may be indicated using one or more WUR action frames.

The period of time after transmission and/or receipt of WUR beacon frame 1402 may be predetermined and/or preconfigured. Alternatively, or in addition, the period of time after transmission and/or receipt of WUR beacon frame 1402 may be signaled in a WUR beacon frame, such as WUR beacon frame 1402. Alternatively, or in addition, the period of time after transmission and/or receipt of WUR beacon frame 1402 may be negotiated using one or more WUR action frames, for example, received and/or transmitted via a PCR.

STA1 1410 may stay awake for at least WUR beacon interval (BI) 1451 and/or for the period of time after transmission and/or receipt of WUR beacon frame 1402. STA1 1410 may receive, or expect to receive, at least one broadcast and/or multicast frame, e.g., during WUR beacon interval 1451 or the period of time following transmission and/or receipt of WUR beacon frame 1402.

If STA1 1410 receives WUR beacon frame 1402 and STA1 1410 is a desired recipient (e.g., one of the desired recipients), STA1 1410 may operate using a PCR and may enter an "on" state at 1413 in response to WUR beacon frame 1402.

STA1 1410 may continue to operate in the duty cycle mode in which it was operating before receipt of WUR beacon frame 1402. A period during which STA1 1410 may stay awake to receive one or more WUR beacons and/or monitor a subsequent WUR BI may not be counted, recorded, or otherwise noted as an "on" duration of a duty cycle. Therefore, such a period may have no impact to a duty cycle associated with STA1 1410.

CSI and/or beamforming related information may be used to perform closed loop transmission. Such information may vary over time. A duration, that may be referred to, for example, as a "CL_parameter_valid_duration," may indicate whether one or more CSI and/or beamforming related parameters may be valid. An AP and/or a STA may operate a timer that may be started upon the setting and/or resetting of CSI and/or beamforming related information. If a value of such a timer becomes greater than a value of a CL_parameter_valid_duration, one or both of an AP and a STA may determine that CSI and/or beamforming related information is not valid. If one or both of an AP and a STA determine that CSI and/or beamforming related information is not valid, updated CSI and/or beamforming related information may be acquired, requested, or otherwise obtained. A CL_parameter_valid_duration value may be predetermined, predefined, and/or configurable. A CL_parameter_valid_duration value may be signaled in one or more WUR negotiation frames, WUR beacon frames, PCR control/management frames (e.g., PCR beacon frames), etc.

Figure 15:
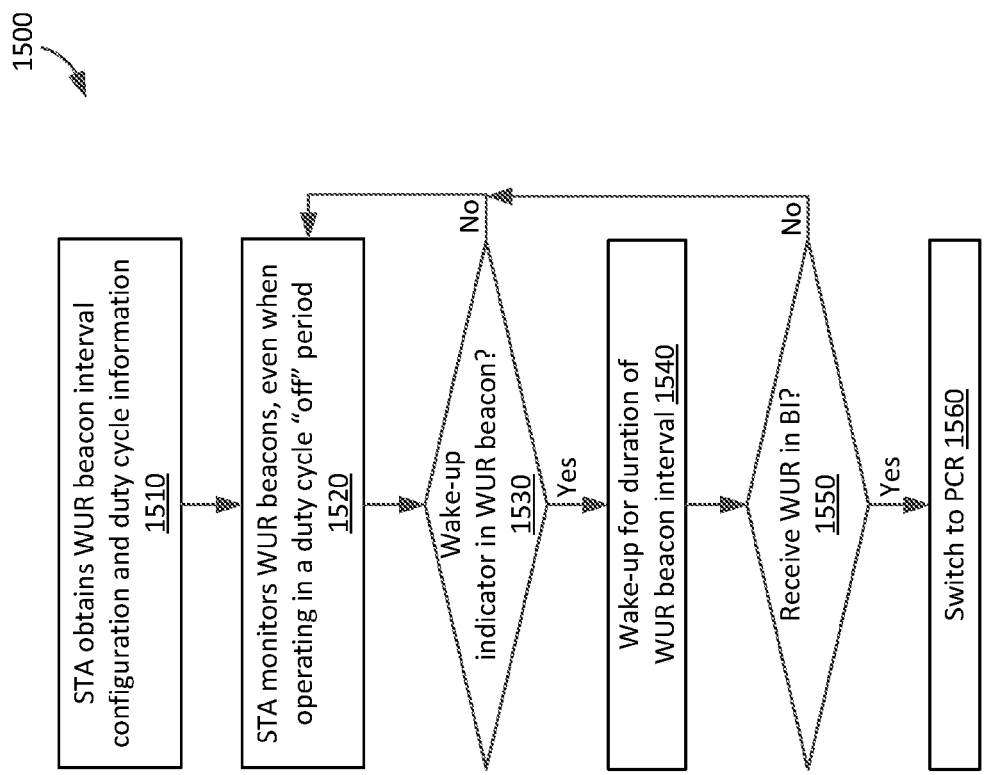
FIG. 15 illustrates a block diagram representing an exemplary method.

FIG. 15 illustrates a diagram representing exemplary method 1500. At block 1510, a STA may acquire, obtain, or otherwise determine a configuration that may indicate a WUR beacon interval. Also, or instead, at block 1510, a STA may acquire, obtain, or otherwise determine configuration and/or other information associated with a WUR duty cycle. For example, a WUR action frame that may contain an indicator of a WUR beacon interval and/or information associated with a WUR duty cycle may be received by a STA from an AP. Based on one or both of WUR beacon interval information and information associated with a WUR duty cycle, a STA may switch to WUR.

At block 1520, a STA may monitor WUR beacons, for example, even when such a STA may be in an "off" period of a duty cycle. At block 1530, a STA may determine whether it has detected and/or received a WUR beacon that may include an indication and/or instruction that one or more WUR STAs (e.g., all WUR STAs) are to stay "awake" for the duration of a WUR beacon interval and/or for a period of time following transmission and/or reception of such a WUR beacon. If, at block 1530, a STA may determine that it has not detected and/or received a WUR beacon that may include an indication and/or instruction that one or more WUR STAs (e.g., all WUR STAs) are to stay "awake" for the duration of a WUR beacon interval and/or for a period of time following transmission and/or reception of such a WUR beacon, method 1500 may return to block 1520 and continue to monitor beacons.

If, at block 1530, a STA may determine that it has detected and/or received a WUR beacon that may include an indication and/or an instruction that one or more WUR STAs (e.g., all WUR STAs) are to stay "awake" for the duration of a WUR beacon interval and/or for a period of time following transmission and/or reception of such a WUR beacon, at block 1540 the STA may "awaken" and remain "awake" for the determined duration (e.g., duration of beacon interval, determined period of time, etc.), for example, even if the STA may be in an "on" period of a WUR duty cycle before (e.g., immediately before) a reception of a WUR beacon and may expect to return to an "off" period of a WUR duty cycle after (e.g., immediately after) reception of the WUR beacon.

If, at block 1530, a STA determines that it has not detected and/or has not received a WUR beacon that may include an indication and/or an instruction that one or more WUR STAs (e.g., all WUR STAs) are to stay "awake" for the duration of a WUR beacon interval and/or for a period of time following transmission and/or reception of such a WUR beacon, a STA may continue to operate in a duty cycle mode in which it was operating before, returning to block 1520.

A time period during which a STA may stay awake to receive one or more WUR beacons and/or monitor a subsequent WUR B1 (or any other duration during which a STA may stay awake to receive one or more WUR beacons and/or monitor a subsequent WUR BI) may not be counted, recorded, or otherwise noted as an "on" duration of a duty cycle. Such a period may have no impact to a duty cycle associated with such a STA.

Note that any period of time during which a STA may remain awake may be predefined, preconfigured, determined dynamically (e.g., as needed) using any criteria that may be applicable, signaled using a WUR beacon frame, negotiated using one or more WUR action frames, (e.g., over using a PCR), etc. All such examples are contemplated herein.

At block 1550, a STA may determine whether it has received a WUR frame since "awakening" at block 1540. If not, a STA may return to block 1520 and continue to monitor beacons and remain in a same duty cycle. If a STA determines that it has received a WUR frame since "awakening" at block 1540, such a STA may activate its PCR and begin using the PCR at block 1560. After activation of its PCR, a STA may maintain, replace, and/or discard any WUR duty cycle settings, for example, depending on WUR negotiation between an AP and the STA before the STA may enter WUR mode.

Figure 16:
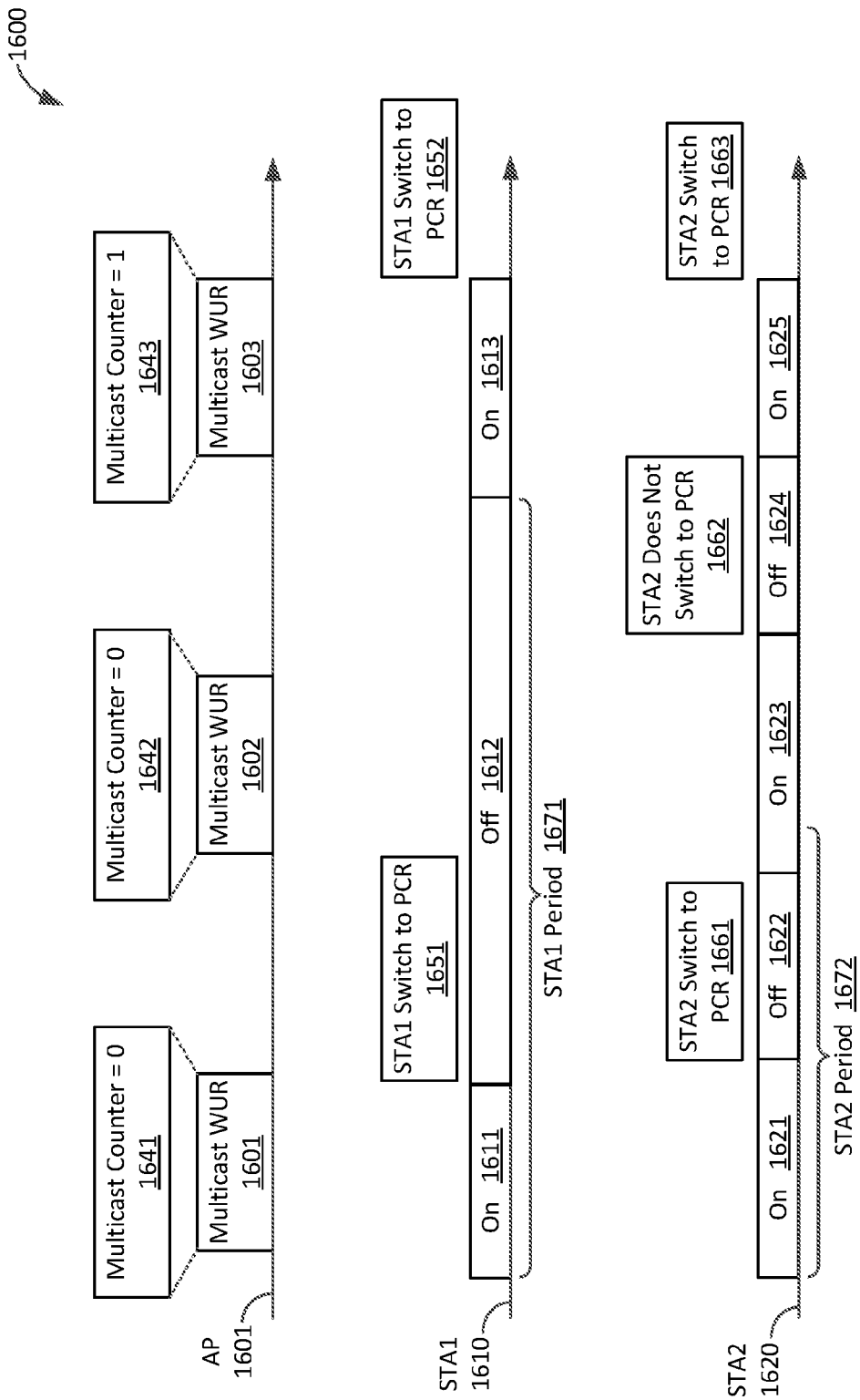
FIG. 16 illustrates an exemplary wake-up procedure.

FIG. 16 illustrates exemplary wake-up procedure 1600. Procedure 1600 may employ repetitive multicast and/or broadcast frames, any one or more of which may include a multicast counter (MC) value.

A STA, such as STA1 1610, STA2 1620, may maintain and/or record an MC value, for example, that may be set to "invalid" by an AP, e.g., initially. STA1 1610 and/or STA2 1620 may be in a duty cycle mode in WUR. An AP may transmit a broadcast/multicast wake up frame and may repeat the transmission multiple times so that STAs in a duty cycle mode may have an opportunity to receive one of such broadcast/multicast wake up frame transmissions. In a broadcast/multicast wake up frame, there may be a field that may indicate whether the frame is a "new" transmission or a repetition of a previously transmitted broadcast/multicast wake up frame. This field may include or indicate a multicast counter (MC) value. For a "new" transmission (e.g., a transmission that may use a different reception group or a different wake up reason than those used in a preceding (e.g., immediately preceding) transmission), STA1 1610 and/or STA2 1620 may expect to detect an increase, decrease, or otherwise altered MC value. For a repetitive transmission (e.g., a transmission that may use a same reception group or a same wake up reason as those used in a preceding (e.g., immediately preceding) transmission), STA1 1610 and/or STA2 1620 may expect to detect an unchanged MC value. Before a STA may enter WUR mode, it may receive a current MC counter value from an AP, e.g., during a WUR negotiation process and/or in a WUR suspend mode. Such an MC counter value may be indicated in one or more WUR response values.

STA1 1610 and/or STA2 1620 may receive multicast/broadcast WUR frame 1601, which may include MC value 1641 that may be 0. STA1 1610 and/or STA2 1620 may receive frame 1601 during their respective "on" periods of 1611 and 1621, during STA1 duty cycle period 1671 and STA2 duty cycle period 1672, respectively. STA1 1610 and/or STA2 1620 may each determine whether to "wake-up" based on comparing MC value 1641 to a maintained MC value that may be stored by STA1 1610 and/or STA2 1620, respectively. Since a value of an MC counter may change, a STA receiving a wake up frame may use one or more current and/or increased future counter values to evaluate whether the received WUR frame is destined for its own BSS by adding an embedded BSSID field and/or one or more GIDs and/or TIDs associated with the STA. Such a STA may evaluate whether the FCS or CRC in the WUR frame can be correctly verified. For example, if a current stored MC value is N, the WUR STA in the WUR mode may insert a value $N \leq n \leq N+m$, where m may be equal or larger than 1, into an MC value field, and evaluate whether the FCS/CRC can be correctly verified. The value m may be indicated by an AP and may be included in a WUR response frame during WUR negotiation process, or in WUR suspend mode, or may be included in a WUR operation element or other element, e.g., in a beacon and/or WUR beacon. A value m may be based on how much time may have elapsed since the WUR STA has received a WUR frame from its AP. If the FCS/CRC can be verified, then the WUR packet may be deemed as valid and meant for the STA's BSS and/or WID/GID.

If one or both of STA1 1610 and STA2 1620 have a maintained MC value that may be a same value as MC value 1641, the respective STA(s) having a stored MC value that matches MC value 1641 may not wake up. If one or both of STA1 1610 and STA2 1620 have a maintained MC value that may not be a same value as MC value 1641, the respective STA(s) having a stored MC value that differs from MC value 1641 may update a stored MC value to the MCS value 1641, wake up, and/or activate its PCR (e.g., STA1 switch to PCR 1651, STA2 switch to PCR 1661).

One or more STAs may maintain a WUR duty cycle setting unless such a setting is updated by an AP, e.g., when such STAs may be using PCR. When such STAs switch to PCR, they may start a PCR timer to record a duration of time during which such STAs remain on PCR. When a PCR timer becomes greater than a predefined, predetermined, and/or configured threshold, a respective STA may determine to remain in PCR for a relatively longer time duration and parameters set by WUR may no longer be considered valid.

When an MC value transmitted in a WUR frame differs from an MC value stored at a STA receiving such a frame, the recipient STA may update its MC value by storing the MC value received in the WUR frame in place of its current MC value, thereby making the stored MC value the same as the MC value received in the WUR frame.

When an MC value transmitted in a WUR frame differs from an MC value stored at a STA receiving such a frame, the recipient STA may activate or otherwise switch to PCR (e.g., 1651, 1661) and may start a PCR timer. For example, MC value 1641 may differ from an MC value stored by STA1 1610, and in response, STA1 1610 may switch to PCR 1651. In such an example, STA1 1610 may be using PCR for a relatively shorter time duration before a PCR timer expiration and may switch back again to WUR and continue entering WUR duty cycle "off" period 1612 during STA1 duty cycle period 1671, and/or save MC value 1641 as its stored MC value. STA1 1610 may enter WUR duty cycle "on" period 1613 and receive another multicast WUR frame 1603 with a MC value 1643. STA1 1610 may compare MC value 1643 with its stored MC value and may determine that the MC values differ. STA1 1610 may switch to PCR 1652 in such a case.

STA2 1620 may use a different WUR duty cycle setting from STA1 1610. In response to multicast WUR frame 1601, STA2 1620 may update its recorded MC value and switch to PCR 1661. It may then switch back to the WUR before the PCR timer may expire and continue using the WUR duty cycle. STA2 1620 may receive multicast WUR frame 1602 with an MC value 1642. STA2 1620 may compare MC value 1642 with its stored MC value and may determine that the MC values are the same. Therefore, STA2 1620 may not switch to PCR 1662.

Such a STA may stop its PCR timer if the STA switches from PCR to WUR and compares its PCR timer to a threshold value (e.g., may be referred to as "PCR_timer_threshold"). If the STA determines that its PCR timer is greater than a PCR_timer_threshold, the STA may set its stored MC value to invalid (e.g., where the STA may remain using PCR for a longer time duration than the time duration used by an AP in transmission of repetitive broadcast and/or multicast frames). If the STA determines that its PCR timer is not greater than a PCR_timer_threshold, the STA may leave its stored MC value unchanged.

STA1 1610 may not receive or otherwise interpret multicast WUR frame 1602, for example, because STA1 1610 may be in WUR duty "off" mode 1612.

STA2 1620 may receive or otherwise interpret multicast WUR frame 1602 and, for example, determine that MC value 1642 does not differ from an MC value stored by STA2 1620 (e.g., where STA2 1620 set its MC value to 0 in response to multicast WUR frame 1601 and MC 1642 may be 0), and therefore, STA2 1620 may not switch to PCR 1662. At an ending of STA2 period 1672, STA2 1620 may enter "on" mode 1623 and begin another duty cycle period, entering "off" mode 1624 following "on" mode 1623. Following "off" mode 1624 period, STA2 1620 may enter "on" mode 1625. STA2 1620 may enter "on" mode 1625, receive multicast WUR frame 1643, determine that MC value 1603 differs from an MC value stored by STA2 1620 (e.g., where STA2 1620 still has its MC value to set to 0 in response to multicast WUR frame 1601 and MC 1643 may be 1) and, in response, STA2 may switch to PCR at 1663.

A BSS Parameter Update counter (BPUS) may be used in a WUR frame to indicate whether a WUR STA in WUR mode needs to be wake up to learn about essential BSS wide parameter update. Since the value of BPUS may change, a STA receiving a wake up frame may need to use the current and/or increased future counter values to evaluate whether the received WUR frame is destined for its own BSS by adding the embedded BSSID field, and/or the STA's WID, GID and/or TID, and evaluate whether the FCS or CRC in the WUR frame can be correctly verified. For example, if the current stored BPUS value is N, the WUR STA in the WUR mode may need to plug in the value $N \leq n \leq N+m$, where m may be equal or larger than 1, into the BPUS value field, and evaluate whether the FCS/CRC can be correctly verified for the received WUR frame. The value m may be indicated by the AP, which may be included in the WUR response frame during WUR negotiation process, or in WUR suspend mode, or may be included in the WUR Operation element or other element in the beacon and/or WUR beacon. The value m may depend (e.g., also depend) on how long the time has elapsed since the WUR STA has received a WUR frame from its AP. If the FCS/CRC is verified, then the WUR packet may be deemed as valid and meant for the STA's BSS and/or WID/GID.

A partial TSF field may be included in a WUR frame, such as WUR beacon frames, e.g., to keep WUR STAs in WUR mode syncing up to the TSF timer. Since the value of the partial TSF (PT) may change, a STA receiving a wake up frame may need to use the current and/or increased future TP value to evaluate whether the received WUR frame is destined for its own BSS by adding the embedded BSSID field, and/or the STA's WID, GID and/or TID, and evaluate whether the FCS or CRC in the WUR frame can be correctly verified. For example, if the current expected value of PT is N, the WUR STA in the WUR mode may need to plug in the value $N-l \leq n \leq N+m$, where m and l may be equal or larger than 1, into the TP value field, and evaluate whether the FCS/CRC can be correctly verified for the received WUR frame. The value m and/or l may be indicated by the AP, which may be included in the WUR response frame during WUR negotiation process, or in WUR suspend mode, or may be included in the WUR Operation element or other element in the beacon and/or WUR beacon. The value m and/or l may depend (e.g., also depend) on how long the time has elapsed since the WUR STA has received a WUR frame from its AP. If the FCS/CRC is verified, then the WUR packet may be deemed as valid and meant for the STA's BSS and/or WID/GID.

In examples, the partial TSF field may not be included in the process of verifying FCS/CRC of the WUR frame. For example, when a WUR STA in WUR mode receives a WUR frame, it may exclude the partial TSF field, and plug in the embedded BSSID field and evaluate whether the FCS/CRC can be correctly verified for the received WUR frame.

An example to verify FCS/CRC for WUR frame may include one or more of the following. If a WUR frame is detected, for K variable fields in a WUR that are part of the FCS/CRC evaluation, the WUR STA may need to evaluate the K variable fields for their potential values $N_k - l_k \leq n_k \leq N_k + m_k$, where $N_k$ is the stored current value or the expected value of the kth variable field, $l_k$ and/or $m_k$ may be equal or larger than 0, may be indicated by the AP, which may be included in the WUR response frame during WUR negotiation process, or in WUR suspend mode, or may be included in the WUR Operation element or other element in the beacon and/or WUR beacon. The value m and/or l may also depend on how long the time has elapsed since the WUR STA has received a WUR frame from its AP. The WUR STA may use these potential values of the K variable fields and/or plug in the embedded BSSID field and evaluate whether the FCS/CRC can be correctly verified for the received WUR frame, while one or more variable field may be ignored in this process, e.g., the partial TSF field. If the FCS/CRC is verified, then the WUR packet may be deemed as valid and meant for the STA's BSS and/or WID/GID. Some example $N_k$ values may include TIDs (Transmitter IDs), WIDs (Wake UP IDs), and/or one of more GIDs (Group IDs) that are assigned to or associated with the WUR STA. In examples, $N_k$ may be the starting/ending GID of the groups to which the WUR STA belongs and may be assigned to the WUR STA. The AP may indicate $l_k$ and/or $m_k$ for the range of GIDs, and/or, $N_k$, indicating group(s) to which the WUR STA belongs.

One or more parameters that may be used in the disclosed aspects (e.g., a number of repetitive broadcast and/or multicast frames (e.g., may be referred to as "N_repetitive"), a duration of time during which repetitive broadcast and/or multicast frames may be transmitted (e.g., may be referred to as "T_repetitive"), a PCR_timer_threshold, a maximum number of an MC value (e.g., may be referred to as "MCmax")) may be predefined or predetermined, and/or may be signaled. Any one or more of such parameters may be signaled in one or more WUR action frames and/or in any other types of frames that may be used for WUR parameter negotiation using, for example, a PCR. Parameters may also, or instead, be signaled in one or more WUR beacon frames and/or other in any other types of frames that may be used as WUR broadcast and/or multicast frames using, for example, a WUR. The parameters may be signaled using control/management frames transmitted over PCR such as PCR beacon frames. Parameter comparisons, such as determining whether a PCR_timer_threshold may be greater than or equal to T_repetitive and determining whether N_repetitive may be less than or equal to MCmax, may be used in a process of determining parameters.

A maximum MC value (MCmax) may be determined by a number of bits assigned to signal the MC value. For an example, an AP may determine and use an increased MC value by using a modulo of MCmax for a new multicast and/or broadcast WUR frame transmission (e.g., MC_new=mod(MC_old+1,MCmax). When two bits are used to signal an MC value, for example, potential MC values may be [0, 1, 2, 3]. An AP may set an MC value (e.g., may set an MC value each time it generates a new WUR multicast/broadcast frame for transmission) to MC_new=mod(MC_old+1,4). In this example, MCmax=4

Figure 17:
FIG. 17 illustrates a block diagram representing an exemplary method.

FIG. 17 illustrates exemplary method 1700 for using an MC value with an AP and a STA in repetitive multicast and/or broadcast frame scenarios. At block 1710, a STA may (e.g., initially) set its stored MC value to invalid. Such a STA may be in a WUR mode. In one case, the STA may be in WUR duty cycle mode. At block 1720, a STA may monitor WUR signals during one or more "on" periods of the duty cycle. At block 1730, a STA may receive a broadcast and/or multicast WUR frame. Such a STA may determine that it may be an intended recipient of such a frame. A received broadcast and/or multicast WUR frame may include an MC value.

At block 1740, a STA may compare an MC value in a received WUR frame with an MC value stored by the STA. If the MC values are the same, the STA may determine that the received WUR frame may be a repeat of a WUR frames received at the STA earlier. In response, the STA may determine not to wake up in response to the received WUR frame. Such a STA may remain in WUR and continue its duty cycle at block 1750 and return to block 1720 to monitor further WUR signals.

If, at block 1740, a STA determines that an MC value in a received WUR frame is not the same as an MC value stored by the STA, at block 1745, the STA may recode its MC value to be the same as the MC value included in the received WUR frame. At block 1755, a STA may switch to PCR operation and start a PCR timer. At block 1765, a STA may stop a PCR timer due to any of the criteria set forth herein, such as a determination that the PCR timer expired, is greater than a predefined, predetermined, or otherwise determined threshold value, etc or the STA may not be in PCR operation mode. A STA may begin again operating in a WUR mode at block 1765.

At block 1775, a STA may compare its (e.g., stopped) PCR timer with a predefined, predetermined, or otherwise determined threshold (e.g., PCR_timer_threshold). At block 1775, a STA may determine its PCR timer is greater than a value of such a threshold and, in response, may change its stored MC value to invalid at block 1790 and may return to block 1720 to monitor further WUR signals. At block 1775, may determine its PCR timer is not greater than a value of such a threshold and, in response, may leave its stored MC value unchanged at block 1785 and may return to block 1720 to monitor further WUR signals.

Any one or more parameters described herein, such as a number of repetitive broadcast and/or multicast frames (N_repetitive), a duration of transmission of such repetitive frames (T_repetitive), a PCR_timer_threshold, a maximum value of an MC value (MCmax), etc., may be predefined, predetermined, signaled, or otherwise determined using one or more WUR action frames and/or one or more of any other type of frames that may be used for WUR parameter negotiations over PCR. Any one or more such parameters described herein may be predefined, predetermined, signaled, or otherwise determined using one or more WUR beacon frames and/or other WUR broadcast and/or multicast frames over WUR. Any one or more such parameters described may adhere to rules such as PCR_timer_threshold>=T_repetitive and/or N_repetitive<=MCmax.

FIG. 18 illustrates exemplary method 1800 that may be implemented by an AP and that may use an MC. At block 1810, an AP may determine multicast information that may be transmitted to one or more STAs. At block 1820, an AP may transmit such information in a broadcast and/or multicast WUR frame. In an example, an AP may transmit a same broadcast and/or multicast WUR frame repeatedly over a period of time. A new frame (e.g., an initial frame in a sequence of repeatedly transmitted frames) may include an MC having a value that differs from one or more previously transmitted frames. Subsequent frames may include an MC having a same value as that included in the initial or new frame.

FIG. 19 illustrates exemplary method 1900 that may be implemented by a STA and that may use an MC. At block 1910, a STA may receive a multicast frame that may have an MC value that differs from an MC value stored by the STA. At block 1920, a STA may change its MC value to that of the MC value included in the received frame and may store the updated MC value. At block 1930, a STA may begin PCR operation and may start a PCR timer. At block 1940, a STA may stop its PCR timer, for example, due to the PCR timer expiring or meeting or exceeding a threshold, or due to the STA entering WUR operation. At block 1950, a STA may begin WUR operation. At block 1960, where a STA's PCR timer expired or met or exceeded a threshold, the STA may set its MC value to invalid. If the STA's MC value was already invalid, such a STA may leave its MC value unchanged.

FIG. 20 illustrates exemplary method 2000 that may be implemented by a STA and that may use an MC. At block 2010, a STA may receive a multicast frame that may have an MC value that may be the same as an MC value stored by the STA. A same MC value may indicate that the received frame is the same as one or more frames already received (e.g., received immediately prior to the most recently received frame. At block 1920, a STA may change its MC value to that of the MC value included in the received frame and may store the updated MC value. At block 1930, a STA may begin PCR operation and may start a PCR timer. At block 2020, a STA may remain in WUR operation and continue a duty cycle.

STAs that share a same WUR group ID may have a synchronized duty cycle. STAs in a synchronized duty cycle may have a same duty cycle period and a same "on" duration. STAs in a synchronized duty cycle may each start their "on" duration at a same time.

STAs with a same WUR group ID may enter WUR mode in different time slots. In order for such STAs to synchronize their duty cycle, a duty cycle period may be an integer number (e.g., a multiple) of a WUR beacon Interval. An "on" duration of a duty cycle period may be allocated at the beginning of the period. STAs (e.g., all STAs synchronized or to be synchronized) that belong to a same WUR group may have a same duty cycle period or different duty cycle periods.

A start time of a duty cycle may be synchronized. A partial timing synchronization function (TSF) timer may be carried in a WUR beacon (e.g., in each WUR beacon). A partial TSF may be used to synchronize a start time of a duty cycle. One or more STAs (e.g., all STAs synchronized or to be synchronized) that may each belong to a same WUR group may have a same duty cycle period T. A start time of a duty cycle may be a time when a partial TSF may equal an integer multiple of T.

One or more STAs (e.g., all STAs synchronized or to be synchronized) that may each belong to a same WUR group may have different duty cycle periods $T_k$, where $k \in \{1, 2, \ldots, K\}$ and K is a total number of STAs in such a group. T may be defined as a least common multiple of $\{T_k \; k=1, \ldots, K\}$. A start time of a duty cycle may be a time when a partial TSF may equal an integer multiple of T.

A broadcast and/or multicast frame may be transmitted to a group when a partial TSF may equal an integer multiple of T.

A broadcast and/or multicast frame may be transmitted to a group when a partial TSF may equal an integer multiple of T plus a delay D (e.g., mT+D). Delay D may be set in an effort to tolerate timing errors among STAs.

A WUR group ID and duty cycle negotiation may be exchanged between an AP and one or more STAs over PCR. Duty cycle negotiation may be performed using WUR action frames and/or any other types of control and/or management frames.

In examples, a WUR Group ID (GID) may have implications on the behaviors of the group of STAs to be woken up. A particular GID in a wake up frame may imply that there are group addressed PCR packets buffered at the AP and that the STAs should wake up to retrieve the group addressed packets using their PCR. A particular GID in a wake up frame may imply that the group of STAs being woken up are (e.g., all) MU capable STAs, and that the STAs may use MU medium access when woken up using their PCR. A particular GID may imply that the STAs should wake up and wait for a trigger frame to transmit trigger-based PPDU to the AP using their PCR. A particular GID may imply that the STAs should wake up and conduct traditional medium access, such as EDCF, contention based medium access using their PCR. The function and implication of GIDs may be indicated in a frame, such as WUR response frames, WUR action frames, that may be transmitted using the PCR, for example, during the WUR negotiation process and/or WUR suspend mode. In the above examples, GIDs are used as examples and may be replaced by WIDs, TIDs, or any other fields or subfields in the wake up frame.

Although features and elements are described herein in reference to illustrated and described examples, and/or particular combinations of examples, each feature or element may be used alone without other features and elements described herein, or in various combinations with or without other features and elements described.

Although the examples described herein consider 802.11 specific protocols, it is understood that the examples described herein are not restricted to those protocols and are applicable to other wireless systems as well.

Although SIFS is used to indicate various inter frame spacing in the examples, all other inter frame spacing such as RIFS or other agreed time interval could be applied.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method performed by a station (STA), the method comprising:
   receiving, in a wake-up radio (WUR) state, a WUR frame from an access point (AP), wherein the WUR frame comprises a multicast counter (MC) field indicating a MC value and at least one field indicating a destination address; and
   when the received MC value is not a same value as a stored MC value, and when the received MC value and the destination address verify that the STA is an intended recipient of the WUR frame, receiving, in a primary connectivity radio (PCR) state, a beacon frame from the AP.

2. The method of claim 1, wherein the STA is operating in a duty cycle.

3. The method of claim 2, wherein the STA is operating in an off period of the duty cycle.

4. The method of claim 2, further comprising, responsive to a determination that the received MC value is a same value as the stored MC value, operating in the WUR state.

5. The method of claim 2, wherein the duty cycle is synchronized with a duty cycle of another STA.

6. The method of claim 4, further comprising, responsive to the determination that the received MC value is the same value as the stored MC value, continuing to operate in the duty cycle.

7. A station (STA) comprising:
   a transceiver configured to, in a wake up radio (WUR) state, receive a WUR frame from an access point (AP), wherein the WUR frame comprises a multicast counter (MC) field indicating an MC value and at least one field indicating a destination address; and a processor and the transceiver configured to,
when the received MC value is not the same value as the stored MC value, and when the received MC value and the destination address verify that the STA is an intended recipient of the WUR frame, receive, in a primary connectivity radio (PCR) state, a beacon frame from the AP.

8. The STA of claim 7, wherein the STA operates in a duty cycle.

9. The STA of claim 8, wherein the STA operates in an off period of the duty cycle.

10. The STA of claim 8, wherein the processor is further configured to, responsive to a determination that the received MC value is a same value as the stored MC value, operate in the WUR state.

11. The STA of claim 8, wherein the duty cycle is synchronized with a duty cycle of another STA.

12. The STA of claim 10, wherein the processor is further configured to, responsive to the determination that the received MC value is the same value as the stored MC value, continue to operate in the duty cycle.

* * * * *